US011874626B2

(12) United States Patent

Sato et al.

(10) Patent No.: US 11,874,626 B2
(45) Date of Patent: Jan. 16, 2024

(54) IMAGE FORMING APPARATUS INCLUDING DRUM CARTRIDGE ATTACHABLE TO DRAWER AND PRESSING MEMBER FOR PRESSING DRUM CARTRIDGE ATTACHED TO DRAWER DOWNWARD

(71) Applicant: Brother Kogyo Kabushiki Kaisha, Nagoya (JP)

(72) Inventors: Shougo Sato, Seto (JP); Miho Ishida, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/365,092

(22) Filed: Jul. 1, 2021

(65) Prior Publication Data

US 2021/0325823 A1 Oct. 21, 2021

Related U.S. Application Data

(63) Continuation of application No. 17/096,028, filed on Nov. 12, 2020, now Pat. No. 11,119,441.

(30) Foreign Application Priority Data

Nov. 18, 2019 (JP) ................................ 2019-208131

(51) Int. Cl.
*G03G 21/18* (2006.01)
*G03G 15/00* (2006.01)
(Continued)

(52) U.S. Cl.
CPC ......... *G03G 21/1803* (2013.01); *G03G 15/75* (2013.01); *G03G 21/10* (2013.01); *G03G 21/1671* (2013.01); *G03G 21/1846* (2013.01)

(58) Field of Classification Search
CPC .... G03G 15/75; G03G 21/1671; G03G 21/18; G03G 21/1803; G03G 21/1814; G03G 21/1817; G03G 21/1821; G03G 21/1846
See application file for complete search history.

(56) References Cited

U.S. PATENT DOCUMENTS

2008/0145119 A1* 6/2008 Tatsumi ............... G03G 21/181
399/359
2008/0159774 A1 7/2008 Tanabe
(Continued)

FOREIGN PATENT DOCUMENTS

JP S60-140961 U 9/1985
JP 2009-031770 A 2/2009
(Continued)

OTHER PUBLICATIONS

Japanese Office Action (with English translation) dated Aug. 8, 2023 (Application No. 2019-208131).
(Continued)

*Primary Examiner* — Benjamin R Schmitt
(74) *Attorney, Agent, or Firm* — BURR PATENT LAW, PLLC

(57) ABSTRACT

An image forming apparatus including a housing, a drawer movable between an inner position accommodated within the housing and an outer position exposed to an outside of the housing, a drum cartridge including a photosensitive drum and a drum frame, and a developing cartridge including a developing roller and a handle. The drum frame includes first side and second side, frames supporting first and second end portions of the photosensitive drum, respectively, and an upper frame connecting upper end portions of the first and second side frames to each other. In a state where the drum cartridge to which the developing cartridge
(Continued)

has been attached is attached to the drawer, a portion of the handle is positioned above the upper frame.

9 Claims, 17 Drawing Sheets

(51) Int. Cl.
*G03G 21/16* (2006.01)
*G03G 21/10* (2006.01)

(56) References Cited

U.S. PATENT DOCUMENTS

| | | | | |
|---|---|---|---|---|
| 2008/0292355 | A1 | 11/2008 | Sakurai | |
| 2009/0003875 | A1 | 1/2009 | Toba et al. | |
| 2009/0003876 | A1 * | 1/2009 | Maeshima | G03G 21/1842 399/111 |
| 2010/0080615 | A1 | 4/2010 | Kikuchi | |
| 2010/0080622 | A1 * | 4/2010 | Uchida | G03G 21/1623 399/117 |
| 2011/0164897 | A1 | 7/2011 | Kikuchi | |
| 2011/0229194 | A1 | 9/2011 | Okabe et al. | |
| 2011/0293325 | A1 | 12/2011 | Okabe | |
| 2014/0093279 | A1 | 4/2014 | Hayakawa et al. | |
| 2014/0147158 | A1 | 5/2014 | Fujinaka et al. | |
| 2014/0361030 | A1 | 12/2014 | Toba | |
| 2014/0363190 | A1 | 12/2014 | Hashimoto et al. | |
| 2017/0031312 | A1 | 2/2017 | Seto | |
| 2018/0095418 | A1 | 4/2018 | Sato et al. | |
| 2019/0302685 | A1 * | 10/2019 | Abe | G03G 21/1647 |

FOREIGN PATENT DOCUMENTS

| | | | |
|---|---|---|---|
| JP | 2009-031771 | A | 2/2009 |
| JP | 2011-197408 | A | 10/2011 |
| JP | 2011-248295 | A | 12/2011 |
| JP | 2014-071362 | A | 4/2014 |
| JP | 2014-106392 | A | 6/2014 |
| JP | 2014-238506 | A | 12/2014 |
| JP | 2017-016149 | A | 1/2017 |
| JP | 2017-032761 | A | 2/2017 |
| JP | 2018-055066 | A | 4/2018 |
| JP | 2018-097285 | A | 6/2018 |

OTHER PUBLICATIONS

Japanese Office Action (with English translation), Japanese Application No. 2019-208131, dated Nov. 28, 2023 (9 pages).

* cited by examiner

IMAGE FORMING APPARATUS INCLUDING DRUM CARTRIDGE ATTACHABLE TO DRAWER AND PRESSING MEMBER FOR PRESSING DRUM CARTRIDGE ATTACHED TO DRAWER DOWNWARD

CROSS REFERENCE TO RELATED APPLICATION

This application is a continuation application of U.S. patent application Ser. No. 17/096,028, filed Nov. 12, 2020 and claims priority from Japanese Patent Application No. 2019-208131 filed Nov. 18, 2019, the entireties of which are incorporated herein by reference.

TECHNICAL FIELD

The present disclosure relates to an image forming apparatus.

BACKGROUND

In electrophotographic-type image forming apparatuses such as color laser printers, positioning of a photosensitive drum at an appropriate position is important in order to perform printing with high accuracy. For example, Japanese Patent Application Publication No. 2011-248295 discloses an image forming apparatus including: a housing including a fixing portion; a drawer provided in the housing and including four photosensitive drums; and four developing cartridges attachable to the drawer and each including a toner container and a developing roller. In this conventional image forming apparatus, the drawer abuts against the fixing portion provided in the housing to position the photosensitive drums.

Further, Japanese Patent Application Publication No. 2014-106392 discloses an image forming apparatus including: a housing including a cover; a drawer; four process cartridges attachable to the drawer and each including a toner container, a developing roller, and a photosensitive drum; and a pressing member provided at the housing. In this image forming apparatus, the pressing member is moved in interlocking relation to closing movement of the cover to press the process cartridge, thereby positioning the photosensitive drum.

SUMMARY

In the image forming apparatus disclosed in Japanese Patent Application Publication No. 2011-248295, all of the four photosensitive drums are supported by the drawer. Accordingly, when any of the photosensitive drums is deteriorated, the photosensitive drums cannot be individually replaced with new ones, and the drawer including the all photosensitive drums need to be replaced with a new drawer at once. This configuration results in a high cost for replacing of the components in the image forming apparatus, since the photosensitive drum(s) which can still be used also need to be replaced together with the deteriorated photosensitive drum.

Also, in the image forming apparatus disclosed in Japanese Patent Application Publication No. 2014-106392, the four photosensitive drums can be replaced independently from one another. However, each of the photosensitive drums and the corresponding one of the developing rollers need to be replaced at once. Further, in a case where the size of the toner container is increased for the purpose of increasing an amount of toner that can be accommodated therein, it becomes difficult to provide the pressing member so that the pressing member can press a portion in the vicinity of the photosensitive drum while avoiding contact with the toner container.

In view of the foregoing, it is an object of the present disclosure to provide an image forming apparatus in which a photosensitive drum and a developing roller corresponding thereto can be replaced individually and appropriate positioning of a pressing member for pressing the photosensitive drum can be ensured.

In order to attain the above and other object, according to one aspect, the present disclosure provides an image forming apparatus including: a housing; a drawer; a drum cartridge; a developing cartridge; and a pressing member. The housing has an opening. The drawer is movable through the opening between: an inner position where the drawer is accommodated within the housing; and an outer position where a portion of the drawer is exposed to an outside of the housing. The drum cartridge is attachable to and detachable from the drawer. The drum cartridge includes: a photosensitive drum; and a drum frame. The photosensitive drum has a first end portion and a second end portion. The drum frame supports the photosensitive drum. The drum frame includes: a first side frame; a second side frame; and an upper frame. The first side frame has an upper end portion, and a lower end portion supporting the first end portion of the photosensitive drum. The second side frame has an upper end portion, and a lower end portion supporting the second end portion of the photosensitive drum. The upper frame connects the upper end portion of the first side frame and the upper end portion of the second side frame to each other. The developing cartridge is attachable to and detachable from the drum frame. The developing cartridge includes: a toner container; and a developing roller. The pressing member is provided in the housing and configured to press the drum frame. In a state where the drum cartridge to which the developing cartridge has been attached is attached to the drawer and the drawer is positioned at the inner position, the developing cartridge is positioned between the photosensitive drum and the upper frame, and the pressing member is positioned above the upper frame to press an upper portion of the upper frame of the drum frame downward.

DETAILED DESCRIPTION OF THE DRAWINGS

The particular features and advantages of the embodiment(s) as well as other objects will become apparent from the following description taken in connection with the accompanying drawings, in which.

Figure 15:
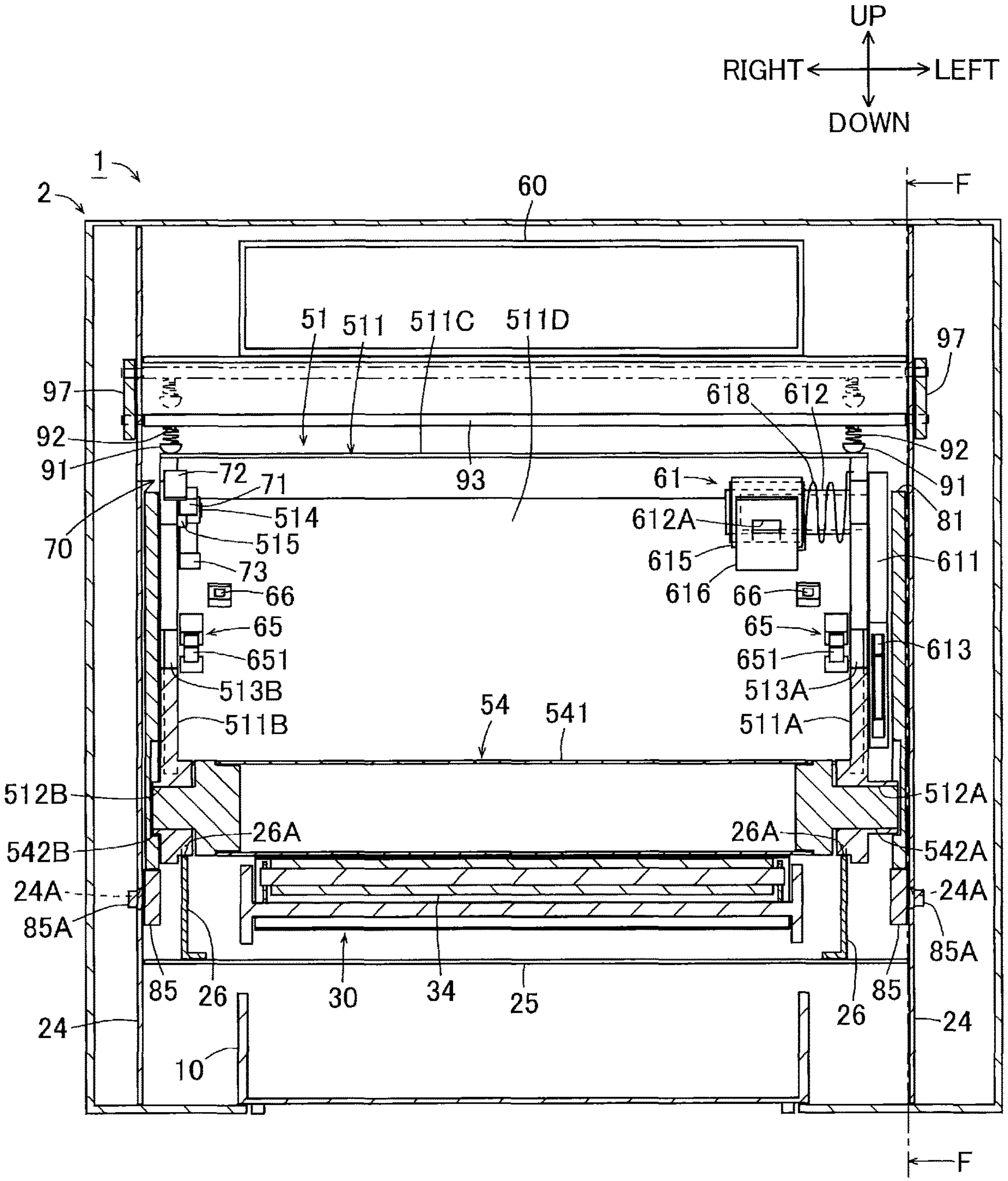
FIG. 15 is a cross-sectional view of the image forming apparatus according to the embodiment taken along the line V-V in FIG. 1.
Figure 18:
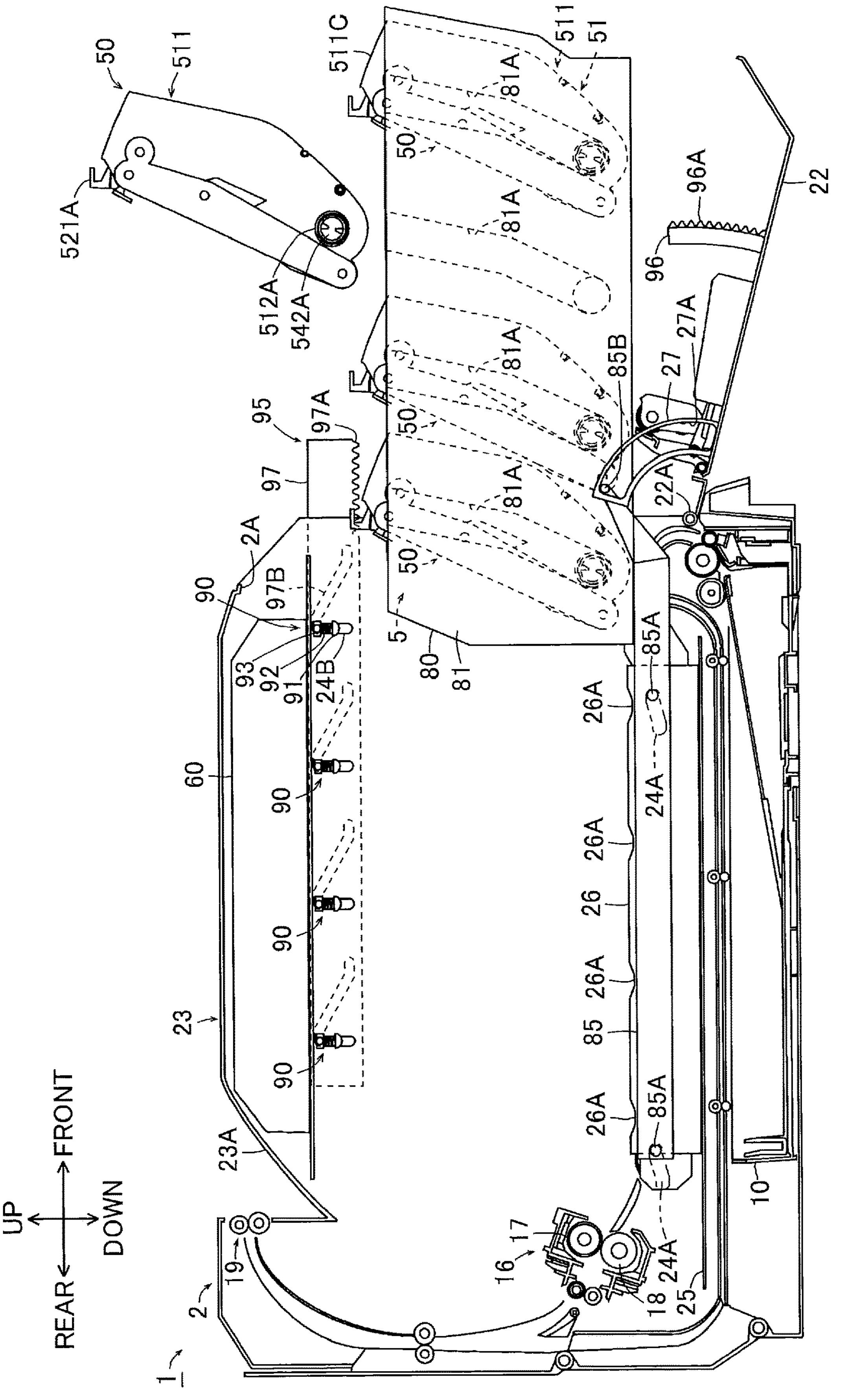
Figure 19:
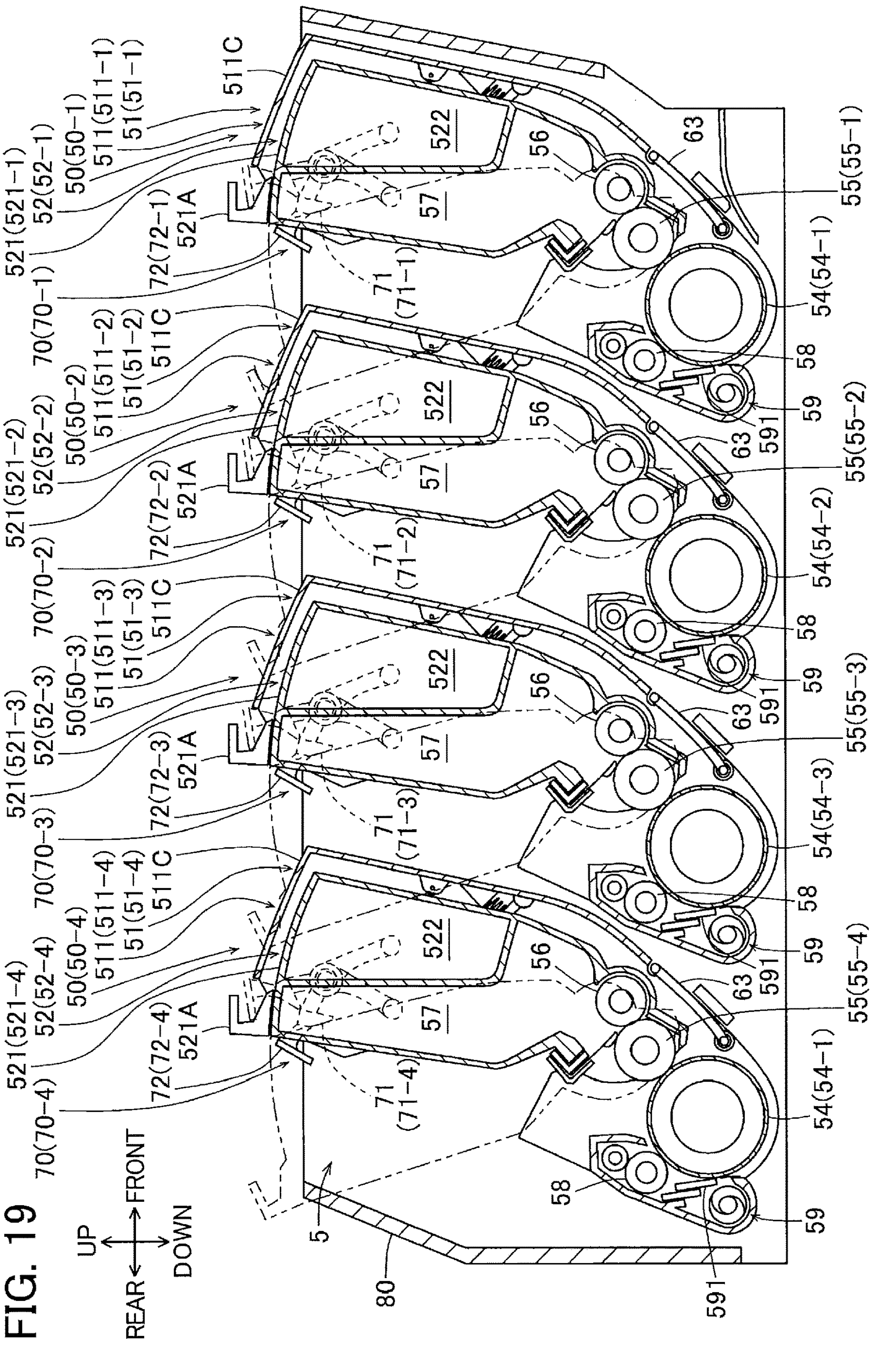

FIG. 18 is a cross-sectional view of the image forming apparatus according to the embodiment taken along the line XVI-XVI in FIG. 15, and illustrating a state where the front cover is in its open position and the drawer is in its outer position; and FIG. 19 is a cross-sectional view of four process cartridges including first to fourth process cartridges attached to the drawer in the outer position in the image forming apparatus according to the embodiment.

DETAILED DESCRIPTION

Hereinafter, an image forming apparatus 1 according to one embodiment of the present disclosure will be described with reference to FIGS. 1 to 19.

Figure 1:
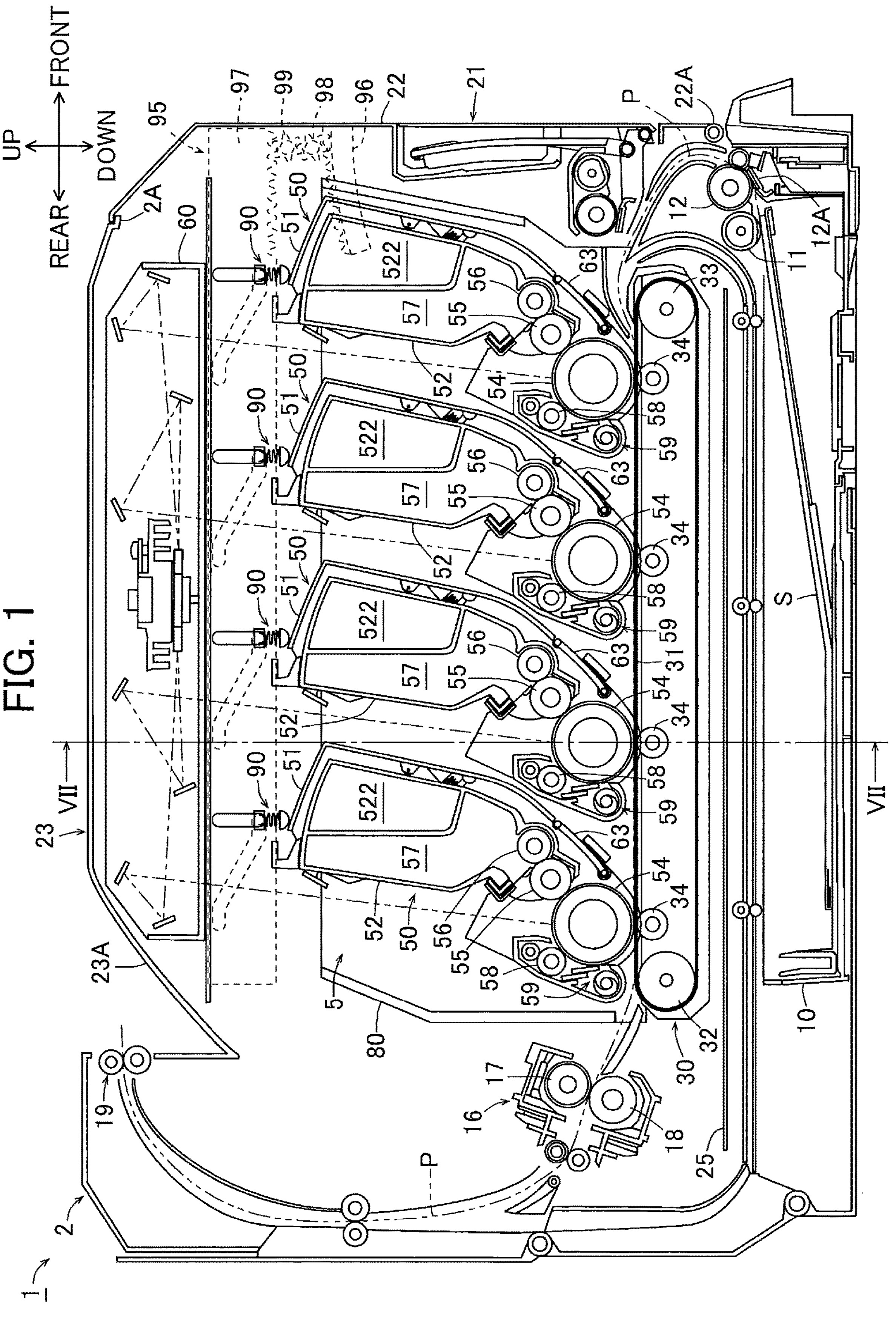
FIG. 1 is a cross-sectional view of an image forming apparatus according to one embodiment of the present disclosure.
Figure 2:
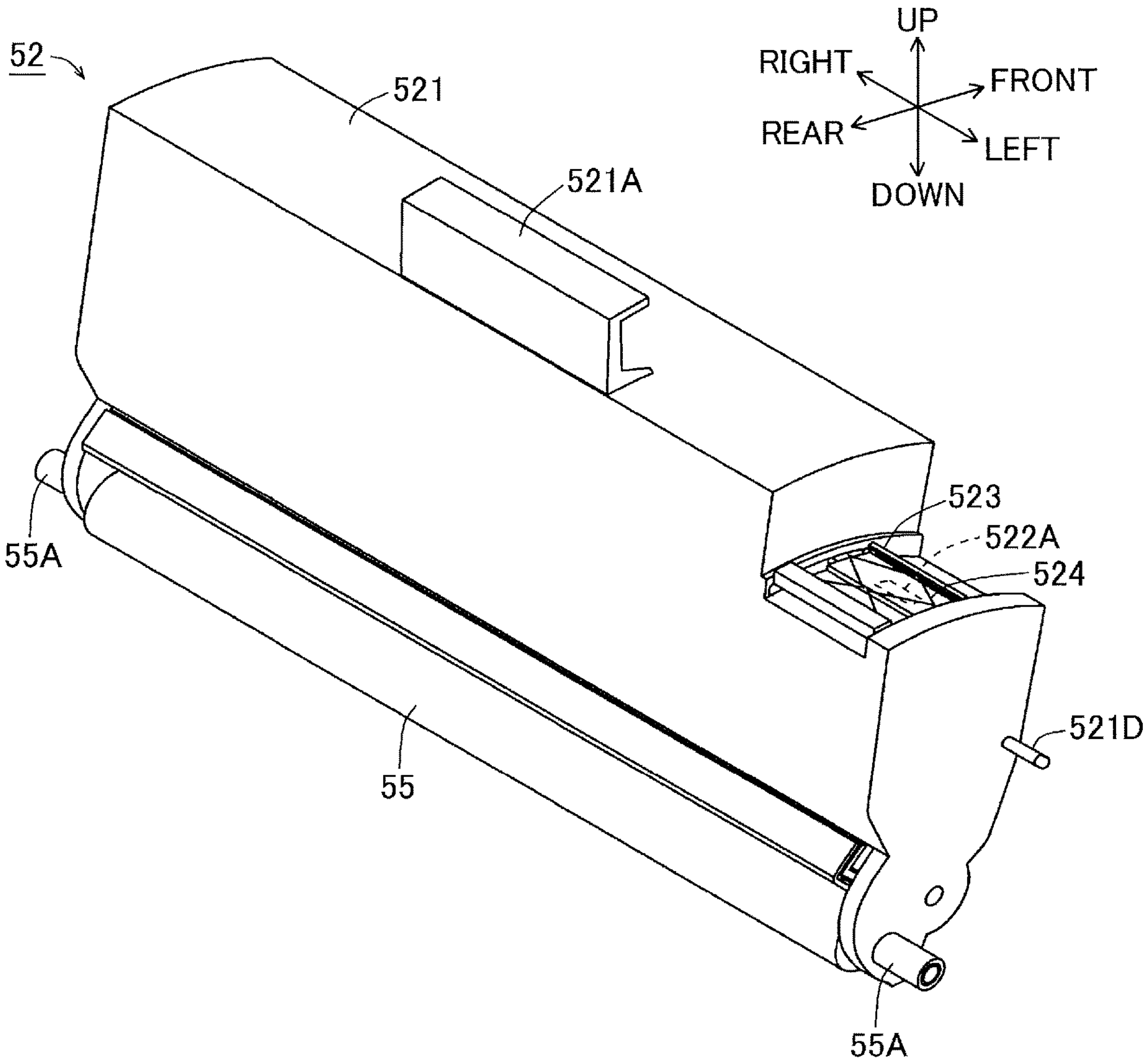
FIG. 2 is a perspective view of a developing cartridge in the image forming apparatus according to the embodiment.
Figure 3:
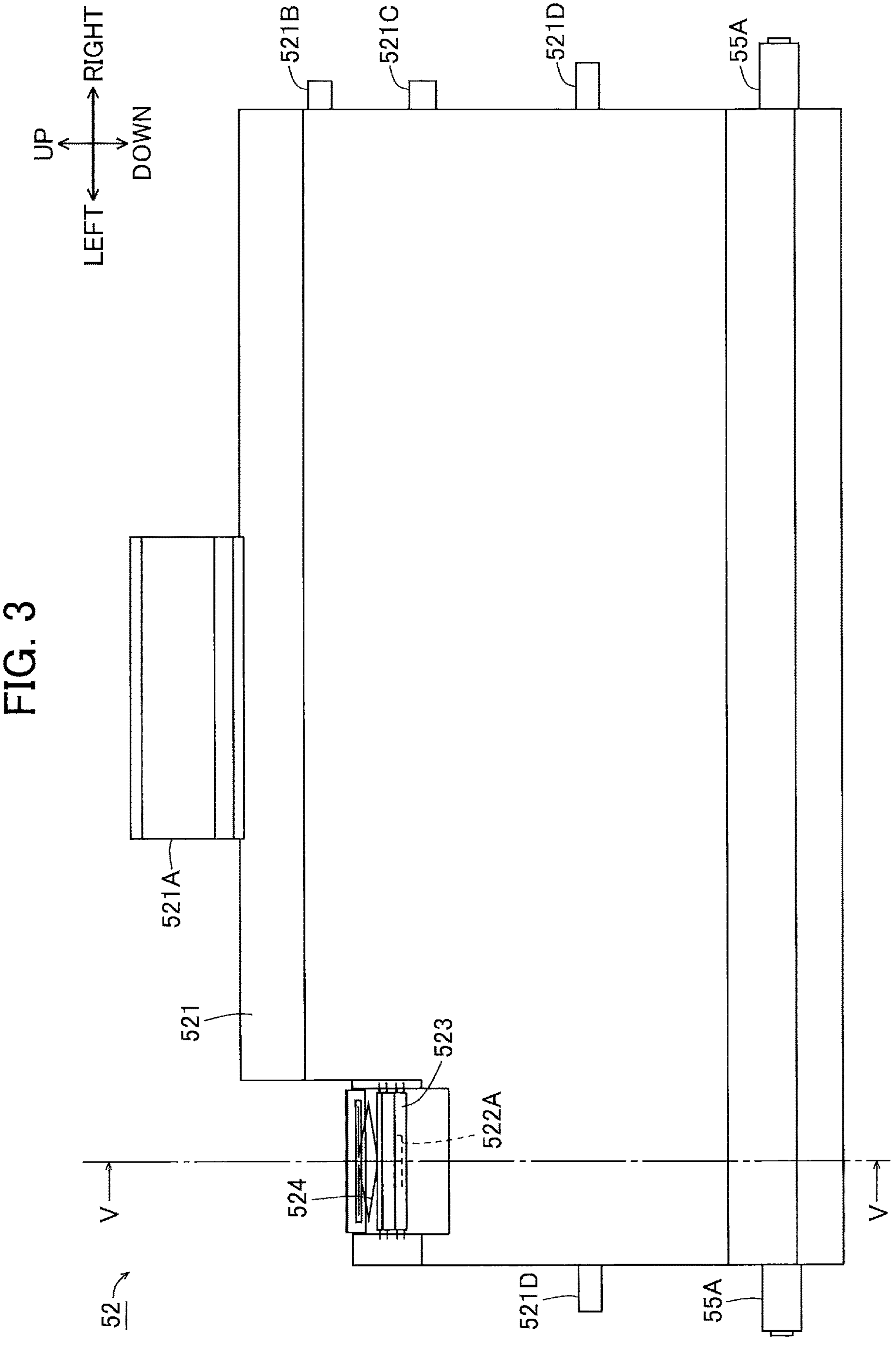
FIG. 3 is a front view of the developing cartridge in the image forming apparatus according to the embodiment.

The image forming apparatus 1 illustrated in FIG. 1 is an electrophotographic type tandem color printer configured to form a multicolor image on a sheet S.

In the following description, the left side, the right side, the near side, the far side, the upper side, and the lower side in FIG. 1 are defined as the rear side, the front side, the left side, the right side, the upper side, and the lower side of the image forming apparatus 1, respectively.

The image forming apparatus 1 includes a housing 2 constituting a main body of the image forming apparatus 1, a sheet tray 10 configured to support sheets S thereon, and an image forming portion 5 configured to form an image on the sheets S.

The housing 2 is in a form of a substantially rectangular parallelepiped shape, and accommodates therein the sheet tray 10 and the image forming portion 5. An opening 2A is formed in a front surface 21 of the housing 2. The housing 2 includes a front cover 22 that can open and close the opening 2A. The front cover 22 is an example of a cover.

The front cover 22 is pivotally movable about a pivot shaft 22A provided at a lower end of the front cover 22. Specifically, the front cover 22 is pivotally movable between a closed position (a position illustrated in FIG. 1) where the front cover 22 closes the opening 2A and an open position (a position illustrated in FIG. 17) where the front cover 22 opens the opening 2A. The housing 2 has an upper surface 23 formed with a discharge tray 23A. The discharge tray 23A is inclined downward from the front side to the rear side.

A conveyance path P of the sheet S is formed within the housing 2. The conveyance path P starts from the sheet tray 10 and reaches the discharge tray 23A via the image forming portion 5. Within the housing 2, a feed roller 11, a separation roller 12, and a separation pad 12A are provided. The sheets S supported by the sheet tray 10 are fed to the conveyance path P by the feed roller 11, and separated one by one by the separation roller 12 and the separation pad 12A. Then, the sheets S are conveyed toward the image forming portion 5.

The image forming portion 5 is positioned above the sheet tray 10. The image forming portion 5 includes four process cartridges 50 arranged in a front-rear direction. The process cartridges 50 are attachable to and detachable from the housing 2, and provided for the respective colors of black, yellow, magenta, and cyan.

The housing 2 further includes a drawer 80. The process cartridges 50 are configured to be supported by the drawer 80. Each of the process cartridges 50 includes a drum cartridge 51 and a developing cartridge 52. The drum cartridges 51 are attachable from and detachable to the drawer 80, and the developing cartridges 52 are attachable to and detachable from the corresponding drum cartridges 51.

Each of the drum cartridges 51 includes a drum frame 511, a photosensitive drum 54, a charge roller 58, and a drum cleaner 59. The photosensitive drum 54 has a substantially cylindrical shape and an axial direction thereof is parallel to a left-right direction. The photosensitive drum 54 is rotatably supported by the drum frame 511 of the drum cartridge 51. The charge roller 58 extends in the left-right direction and are in contact with an upper rear portion of the photosensitive drum 54. The drum cleaner 59 includes a cleaning blade 591 (see FIG. 8). The cleaning blade 591 has a plate-like shape elongated the left-right direction, and is configured to make contact with a surface of the photosensitive drum 54. Specifically, a lower front end portion of the cleaning blade 591 is in contact with a rear portion of the photosensitive drum 54.

Figure 5A:
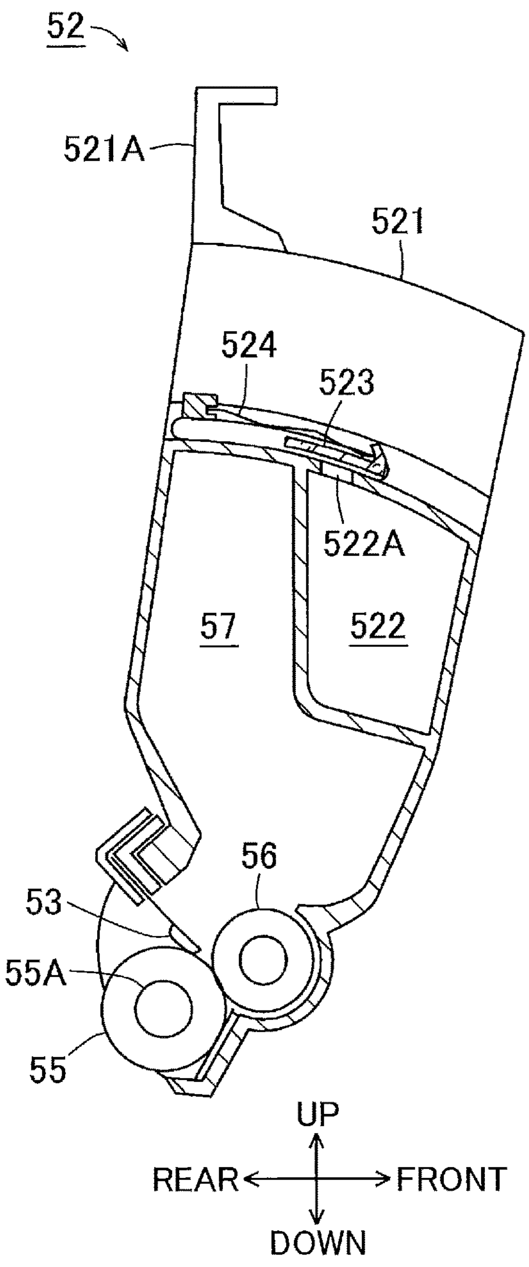
FIG. 5A is a cross-sectional view taken along a line V-V in FIG. 3, and illustrating a state where an inlet port shutter of the developing cartridge is in its inlet port closing position.
Figure 5B:
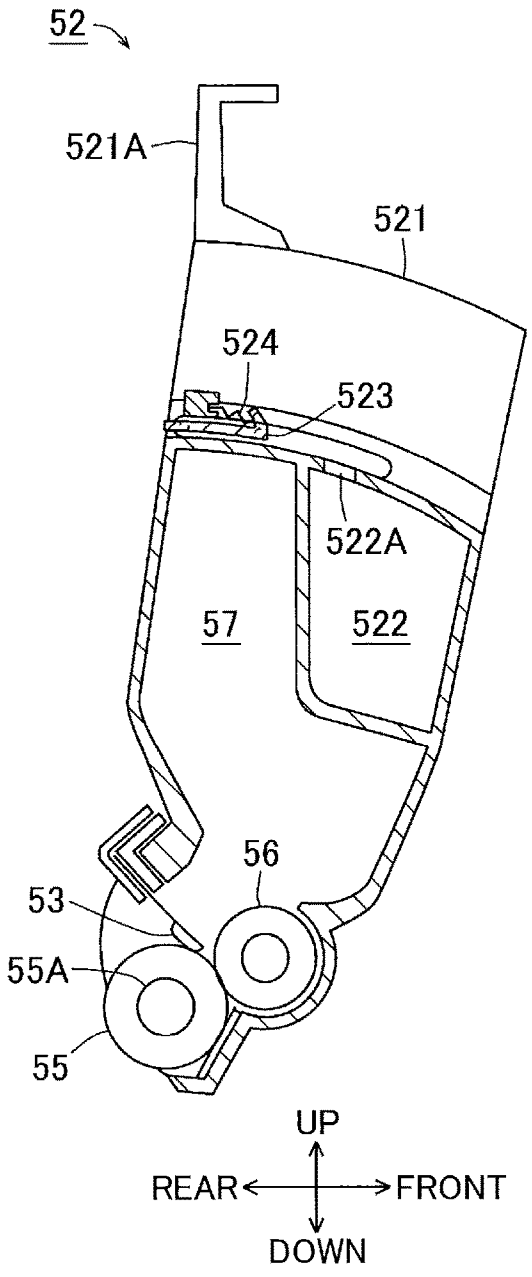
FIG. 5B is a cross-sectional view taken along a line V-V in FIG. 3, and illustrating a state where the inlet port shutter of the developing cartridge is in its inlet port opening position.
Figure 6:
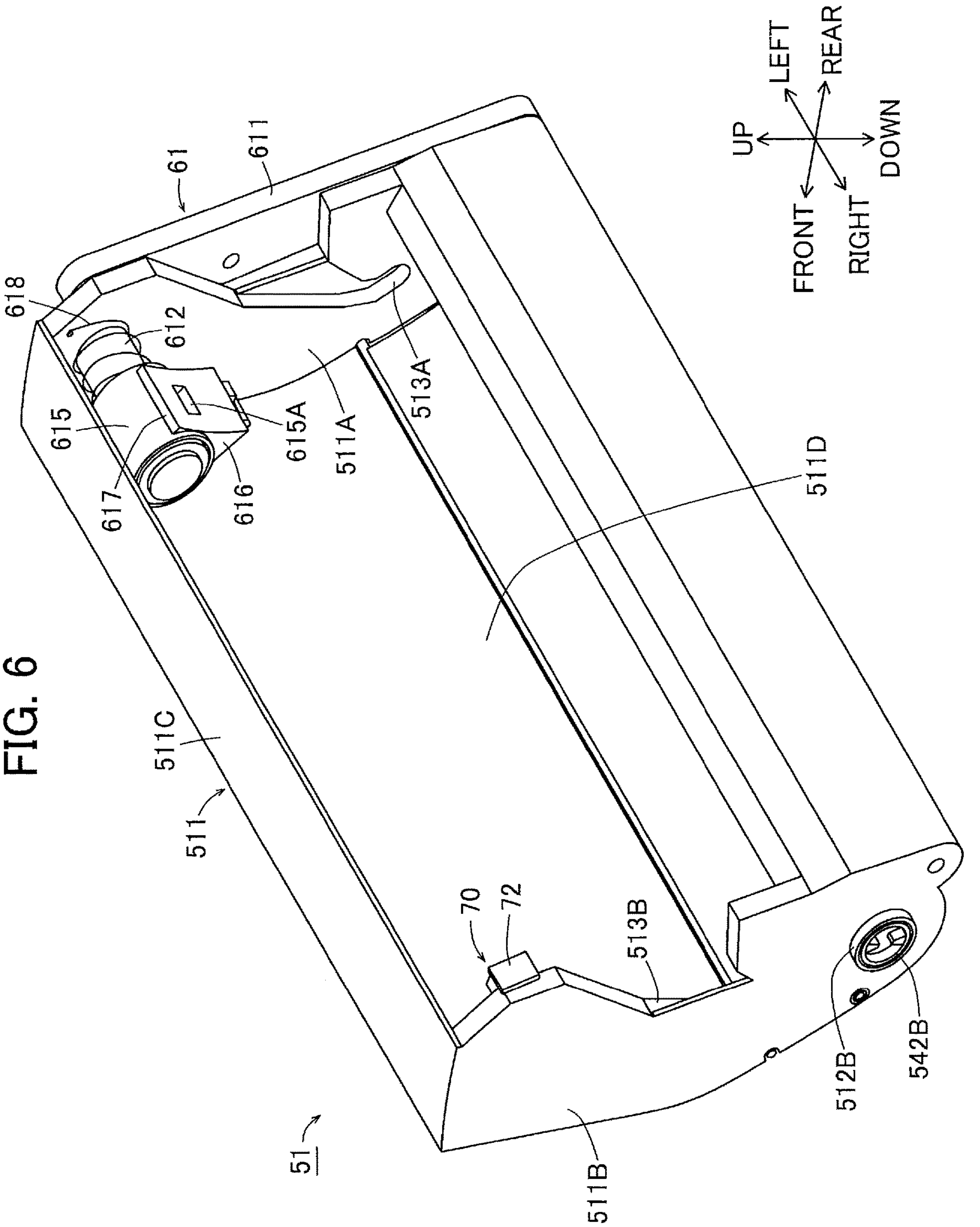
FIG. 6 is a perspective view of a drum cartridge in the image forming apparatus according to the embodiment.

Each of the developing cartridges 52 includes a developing roller 55, a supply roller 56, a toner container 57, and a layer thickness regulation blade 53 (see FIGS. 5A and 5B). The developing roller 55 extends in the left-right direction, and has a lower rear portion exposed to an outside of the developing cartridge 52 from a lower rear portion thereof.

Accordingly, the developing roller 55 is in contact with an upper front portion of the corresponding photosensitive drum 54.

The supply roller 56 extends in the left-right direction, and is in contact with an upper front portion of the developing roller 55. The toner containers 57 is positioned above the supply roller 56 and configured to accommodate toner therein. The layer thickness regulation blade 53 is disposed so as to be in contact with a surface of the developing roller 55.

Toner accommodated in the toner container 57 is supplied to the supply roller 56, and then supplied from the supply roller 56 the developing roller 55. At this time, the toner in the toner container 57 flows and accumulates around the supply roller 56 due to the gravitational force. Therefore, toner can be supplied to a surface of the supply roller 56 by virtue of the gravitational force irrespective of the fact that a mechanism for supplying toner to the surface of the supply rollers 56 is not provided within the toner container 57. The layer thickness regulation blade 53 contacts the surface of the rotating developing roller to regulate a thickness of toner layer on the surface of the developing roller 55 to a predetermined thickness. The developing roller 55 is configured to supply toner supplied from the supply roller 56 to the corresponding photosensitive drum 54.

In this way, in the image forming apparatus 1, the developing cartridge 52 including the developing roller 55 can be attached to and detached from the corresponding drum cartridge 51 including the photosensitive drum 54. With this configuration, the photosensitive drum 54 and the developing roller 55 can be replaced independently from each other.

The image forming apparatus 1 further includes an exposure unit 60 provided above the process cartridges 50. The exposure unit 60 is configured to expose the surfaces of the photosensitive drums 54.

As illustrated in FIG. 1, the image forming apparatus 1 further includes a belt unit 30 that is constituted by a belt 31, a driving roller 32, a driven roller 33, and transfer rollers 34. The belt 31 is disposed below and opposite to the photosensitive drums 54 with respect to the conveyance path P, and looped over the driving roller 32 and the driven roller 33 positioned to the front of the driving roller 32. The transfer rollers 34 are disposed opposite to the corresponding photosensitive drums 54 so that the belt 31 is interposed between the transfer rollers 34 and the corresponding photosensitive drums 54.

In the image forming portion 5, the surface of each photosensitive drum 54 is charged by the corresponding charge roller 58. Then, the surface of each photosensitive drum 54 is selectively exposed by the exposure unit 60 in accordance with predetermined image data. Accordingly, an electrostatic latent image is formed on the surface of the photosensitive drum 54 based on the image data.

In the meantime, toner accommodated in the toner container 57 is charged between the supply roller 56 and the developing roller 55, and carried onto the surface of the developing roller 55. The toner on the developing roller 55 is then supplied to the electrostatic latent image formed on the surface of the photosensitive drum 54. Thus, a toner image is formed on the surface of the photosensitive drum 54.

Upon the sheet S conveyed toward the image forming portion 5 reaching the belt 31, the sheet S is conveyed by the belt 31 and passes between the belt 31 and the respective photosensitive drums 54 successively. The toner images on the surfaces of the photosensitive drums 54 are transferred to the sheet S by a transfer bias applied to the transfer rollers 34 when the respective toner images come to face the sheet S. In this manner, the toner images on the photosensitive drums 54 are transferred to the sheet S by the belt unit 30.

After the toner image has been transferred to the sheet S, some toner that has failed to be transferred to the sheet S may remain on the surface of the photosensitive drum 54. This residual toner remaining on the surface of the photosensitive drum 54 is scraped from the surface of the photosensitive drum 54 by the cleaning blade 591 of the drum cleaner 59 as the photosensitive drum 54 is rotated. Thus, residual toner that has remained on the surface of the photosensitive drum 54 is collected by the drum cleaners 59.

Note that, while the belt 31 according to the present embodiment serves as a conveyance belt that conveys a sheet S to which a toner image is to be transferred, the belt 31 may serve as an intermediate transfer belt to which a toner image is transferred, and the toner image transferred to this intermediate transfer belt is then transferred to a sheet S.

The sheet S to which the toner images have been transferred is conveyed to a fixing device 16 disposed downstream of the image forming portion 5 in a conveying direction of the sheet S. The fixing device 16 includes a heat roller 17 and a pressure roller 18 in pressure contact with the heat roller 17. The sheet S conveyed to the fixing device 16 passes through a portion between the heat roller 17 and the pressure roller 18, and thus the toner images on the sheet S are thermally fixed to the sheet S.

The sheet S to which the toner images have been thermally fixed is conveyed downstream of the fixing device 16 in the conveying direction. The sheet S is conveyed further by a discharge roller 19, and discharged onto the discharge tray 23A.

[Developing Cartridges]

As illustrated in FIGS. 2 to 5B, each of the developing cartridges 52 further includes a developing frame 521 that rotatably supports the corresponding developing roller 55. The developing roller 55 includes a roller shaft 55A, and the roller shaft 55A is supported by the developing frame 521. The toner container 57 is formed inside the developing frame 521.

A handle 521A is formed on an upper end portion of the developing frame 521. A user can grasp the handle 521A to detach the developing cartridge 52 from the drum cartridge 51. The handle 521A is located at a rear end portion of the developing frame 521 in the front-rear direction in a state where the developing cartridge 52 is attached to the drum cartridge 51 and the drum cartridge 51 is attached to the drawer 80.

A residual toner container 522 is formed in the developing frame 521. Residual toner collected from the surface of the photosensitive drum 54 by the drum cleaner 59 is collected into the residual toner container 522. The residual toner container 522 is located at a position upward and frontward of the toner container 57.

An inlet port 522A is formed in an upper surface of the residual toner container 522. Residual toner is collected into the residual toner container 522 through the inlet port 522A. The developing cartridge 52 also includes an inlet port shutter 523 that can open and close the inlet port 522A. The inlet port shutter 523 is positioned above the residual toner container 522.

The inlet port shutter 523 is movable in the front-rear direction. In accordance with movement of the inlet port shutter 523 in the front-rear direction, the inlet port shutter 523 is movable between an inlet port closing position (a position illustrated in FIG. 5A) where the inlet port shutter 523 closes the inlet port 522A and an inlet port opening position (a position illustrated in FIG. 5B) where the inlet port shutter 523 opens the inlet port 522A. The inlet port shutter 523 in the inlet port opening position is positioned rearward than the inlet port shutter 523 the inlet port closing position.

The developing cartridge 52 also includes a spring 524 that urges the inlet port shutter 523 toward the inlet port closing position. As the spring 524 urges the inlet port shutter 523, the inlet port shutter 523 is movable to and positioned at the inlet port closing position. On the other hand, the inlet port shutter 523 is movable to the inlet port opening position by moving rearward against the urging force of the spring 524.

Figure 4:
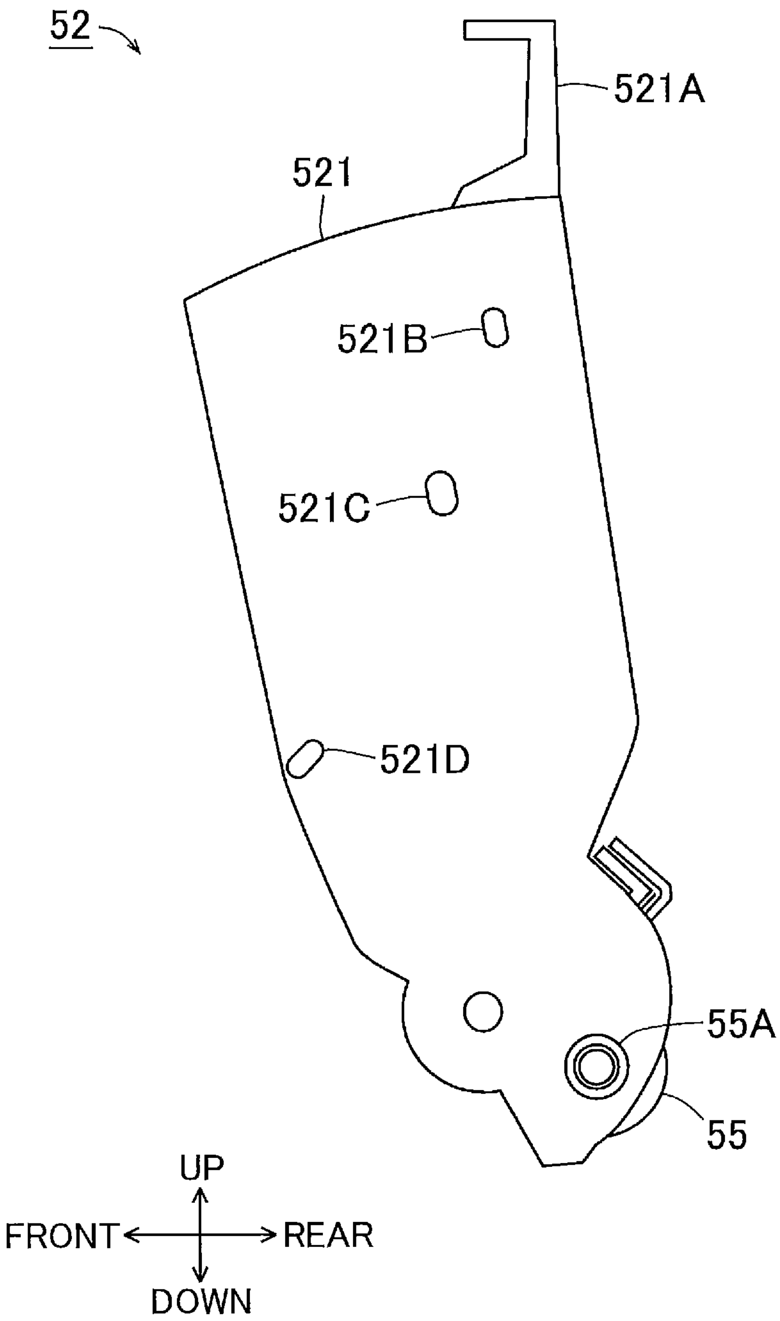
FIG. 4 is a side view of the developing cartridge in the image forming apparatus according to the embodiment as viewed from the right side thereof.

As illustrated in FIG. 4, a first protrusion 521B and a second protrusion 521C are provided on a right surface of the developing frame 521. The first protrusion 521B and the second protrusion 521C are configured to engage with a lock member 70 (see FIG. 9; described later) of the corresponding drum cartridge 51. Third protrusions 521D are provided on respective left and right surfaces of the developing frame 521. The third protrusions 521D are configured to engage with respective pressure-fixing units 65 (see FIG. 9; described later) of the corresponding drum cartridge 51.

The developing cartridge 52 with the above configuration is movable between a first position (a position illustrated in FIG. 14) and a second position (a position illustrated in FIG. 13) in a state where the developing cartridge 52 is attached to the drum cartridge 51. When the developing cartridge 52 is in the first position, the developing cartridge 52 is allowed to be detached from the drum cartridge 51. When the developing cartridge 52 is in the second position, the developing roller 55 is supported by the developing cartridge 52 at a position where the developing roller 55 can supply toner to the photosensitive drum 54. In the second position, the developing cartridge 52 cannot be detached from the drum cartridge 51.

[Drum Cartridges]

<Drum Frame>

As illustrated in FIGS. 6 to 10, the drum cartridge 51 includes the drum frame 511 that rotatably supports the photosensitive drum 54. The photosensitive drum 54 includes a drum body 541, a drum shaft 542A, and a drum shaft 542B. The drum shaft 542A protrudes leftward from the drum body 541, whereas the drum shaft 542B protrudes rightward from the drum body 541. The drum shafts 542A and 542B are supported by the drum frame 511. The drum shaft 542A is an example of a first end portion of a photosensitive drum, and the drum shaft 542B is an example of a second end portion of the photosensitive drum.

The drum frame 511 includes a first side frame 511A formed in a left end portion thereof, a second side frame 511B formed in a right end portion thereof, an upper frame 511C, and a front frame 511D.

The first side frame 511A extends orthogonally to a rotational axis of the photosensitive drum 54 and rotatably supports the drum shaft 542A. The first side frame 511A has a support portion 512A in its lower end portion thereof. The support portion 512A is formed with a through-hole through which the drum shaft 542A is inserted. With this configuration, the drum shaft 542A is rotatably supported by the support portion 512A.

The second side frame 511B extends orthogonally to the rotational axis of the photosensitive drum 54 and rotatably supports the drum shaft 542B. The second side frame 511B has a support portion 512B in its lower end portion thereof. The support portion 512B has a through-hole for receiving the drum shaft 542B to rotatably support the same.

The upper frame 511C extends in the left-right direction and the front-rear direction to connect an upper end portion of the first side frame 511A and an upper end portion of the second side frame 511B to each other. The front frame 511D extends in the left-right direction and an up-down direction to connect a front end portion of the first side frame 511A and a front end portion of the second side frame 511B to each other, and to extend from a front end portion of the upper frame 511C toward a leg 63 (described later).

Note that the front frame 511D does not need to be connected to the front end portion of the first side frame 511A. Further, the front frame 511D may be constituted of a plurality of frames extending in the left-right direction. The drum frame 511 can accommodate the developing cartridge 52 within a space defined by the first side frame 511A, the second side frame 511B, the upper frame 511C, the front frame 511D, and the photosensitive drum 54.

<Guide Grooves>

The first side frame 511A has an inner surface in the left-right direction (a right surface) formed with a guide groove 513A. Similarly, the second side frame 511B has an inner surface in the left-right direction (a left surface) formed with a guide groove 513B. The guide grooves 513A and 513B extend substantially in the up-down direction and are curved rearward from the upper side to the lower side. The guide grooves 513A and 513B are formed at positions above the photosensitive drum 54.

The guide grooves 513A and 513B have upper ends that are open so that the guide grooves 513A and 513B can receive the roller shaft 55A of the developing roller 55 through the upper ends thereof. The developing cartridge 52 can be attached to the drum cartridge 51 by inserting the roller shaft 55A into the guide grooves 513A and 513B.

<Residual Toner Conveyance Portion>

The drum cartridge 51 further includes a residual toner conveyance portion 61. The residual toner conveyance portion 61 is configured to convey residual toner collected from the photosensitive drum 54 by the drum cleaner 59 to the residual toner container 522 of the developing cartridge 52. The residual toner conveyance portion 61 includes a vertical conveyance case 611, a lateral conveyance case 612, a conveyor 613, a screw 614, a residual toner conveyance shutter 615, a first abutment piece 616, a second abutment piece 617, and a spring 618.

The vertical conveyance case 611 extends from a lower end portion to an upper end portion in a left end portion of the drum cartridge 51. The lateral conveyance case 612 is disposed on an upper-left end portion of the drum frame 511, and is coupled to the vertical conveyance case 611. The lateral conveyance case 612 has a lower end portion formed with a residual toner discharge port 612A that allows residual toner to pass therethrough.

The conveyor 613 is disposed within the vertical conveyance case 611 and configured to convey residual toner collected by the drum cleaner 59 toward an upper end portion of the vertical conveyance case 611. The drum cleaner 59 is located on a lower end portion of the vertical conveyance case 611 in the up-down direction. The screw 614 is provided inside the lateral conveyance case 612 such that an axial direction thereof is parallel to the left-right direction. The screw 614 is configured to convey the residual toner conveyed to the upper end portion of the vertical conveyance case 611 by the conveyor 613 toward the residual toner discharge port 612A.

The residual toner conveyance shutter 615 can open and close the residual toner discharge port 612A. The residual toner conveyance shutter 615 is in a form of a substantially cylindrical member, and mounted around an outer periphery of the lateral conveyance case 612 to be pivotally movable relative to the lateral conveyance case 612. The residual toner conveyance shutter 615 has a communication port 615A.

By the pivotal movement relative to the lateral conveyance case 612, the residual toner conveyance shutter 615 is movable between a discharge port opening position where the residual toner conveyance shutter 615 opens the residual toner discharge port 612A to allow communication with the communication port 615A and a discharge port closing position where the residual toner conveyance shutter 615 closes the residual toner discharge port 612A to prevent communication with the communication port 615A.

The residual toner conveyance shutter 615 is urged by the spring 618 toward the discharge port closing position. The first abutment piece 616 is provided on the residual toner conveyance shutter 615 and is pivotally movable along with the residual toner conveyance shutter 615 so that the first abutment piece 616 can abut against the developing cartridge 52.

In the residual toner conveyance portion 61, when the developing cartridge 52 attached to the drum cartridge 51 is in the first position (the position illustrated in FIG. 14), the first abutment piece 616 does not abut against the developing cartridge 52, and the residual toner conveyance shutter 615 is in the discharge port closing position due to the urging force of the spring 618. On the other hand, when the developing cartridge 52 attached to the drum cartridge 51 is in the second position (the position illustrated in FIG. 13), the first abutment piece 616 abuts against the developing cartridge 52, and the residual toner conveyance shutter 615 is in the discharge port releasing position against the urging force of the spring 618.

The second abutment piece 617 is also provided on the residual toner conveyance shutter 615 and pivotally movable along with the residual toner conveyance shutter 615. The second abutment piece 617 is configured to abut the inlet port shutter 523 of the developing cartridge 52.

<Lock Member>

Figure 9:
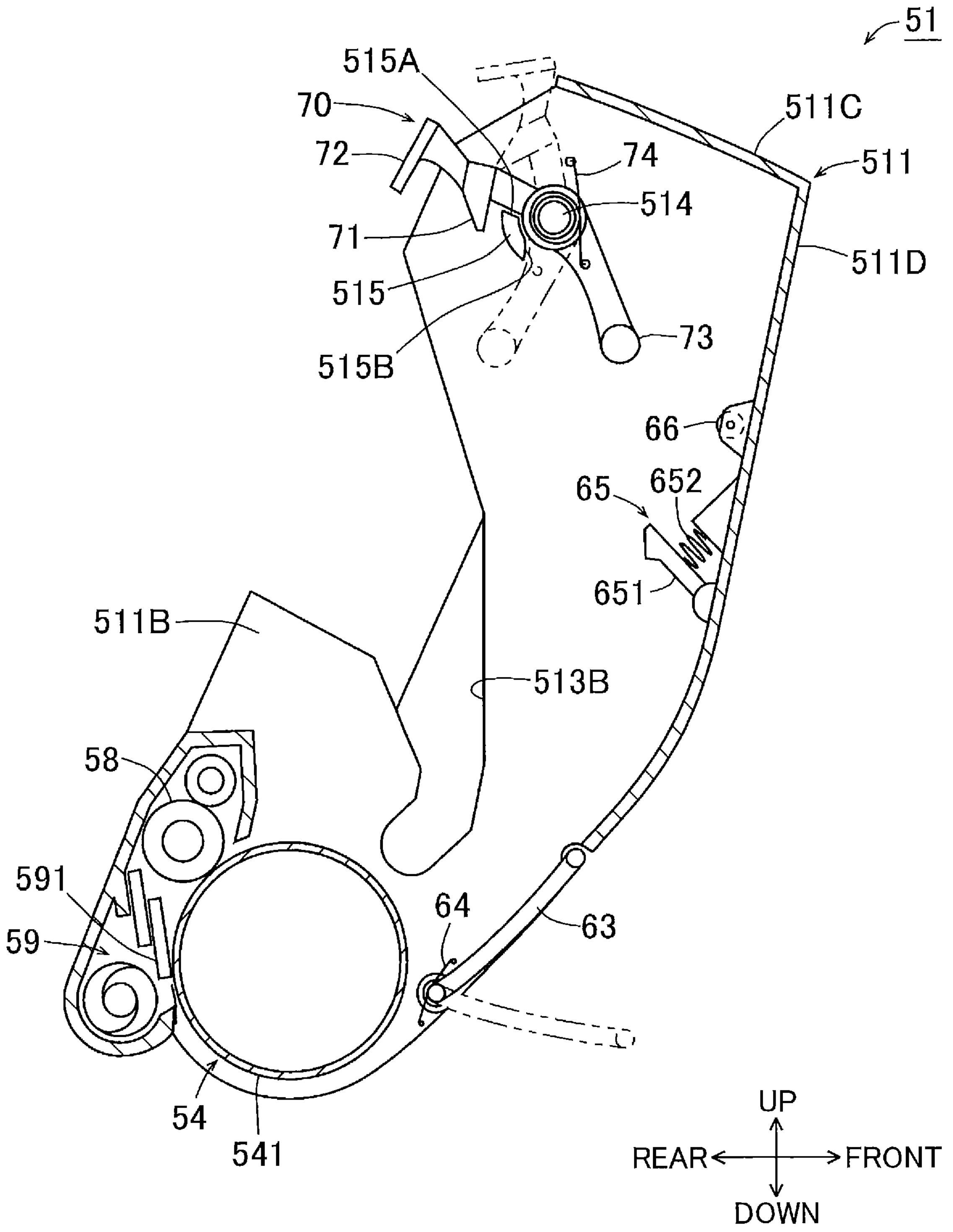
FIG. 9 is a cross-sectional view of the drum cartridge taken along a line IX-IX in FIG. 7.
Figure 10:
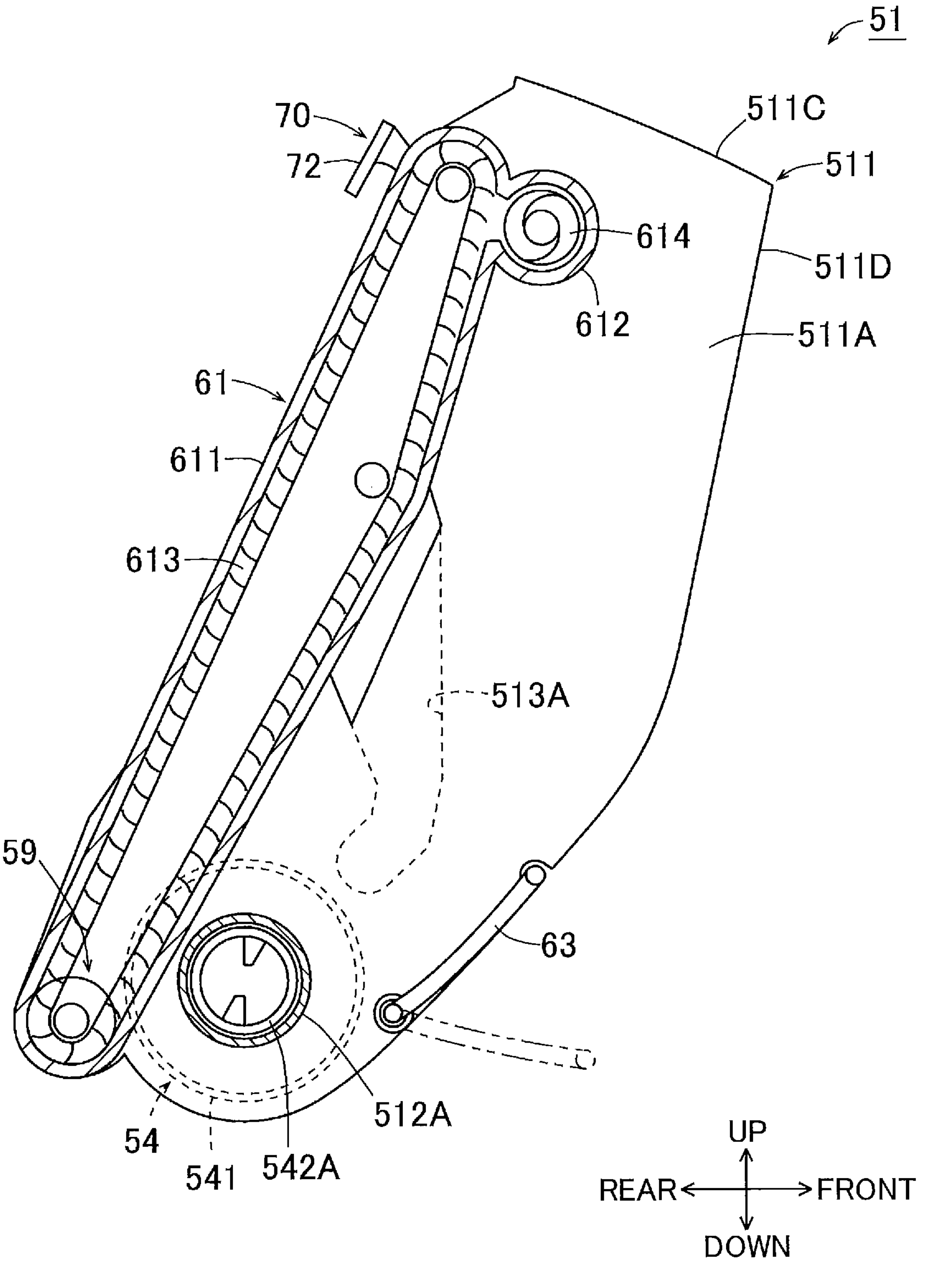
FIG. 10 is a cross-sectional view of the drum cartridge taken along a line X-X in FIG. 7.

As illustrated in FIG. 9, the drum cartridge 51 further includes the lock member 70. The lock member 70 is movable between a lock position (a position indicated by a solid line in FIG. 9) where the lock member 70 prevents the pivotal movement of the developing cartridge 52 from the second position to the first position, and an unlock position (a position indicated by a dashed-two-dotted line in FIG. 9) where the lock member 70 allows the pivotal movement of the developing cartridge 52 from the second position to the first position.

The second side frame 511B of the drum cartridge 51 includes a pivot shaft 514 extending in the left-right direction. The lock member 70 is pivotably supported by the pivot shaft 514. The lock member 70 includes a lock claw 71, an operation lever 72, and a push lever 73. The lock claw 71 is an example of an engagement portion, and the operation lever 72 is as an example of an operator. The lock claw 71, the operation lever 72, and the push lever 73 are pivotally movable integrally about the pivot shaft 514. As the lock member 70 is pivotally moved about the pivot shaft 514, the lock member 70 is movable between the lock position and the unlock position.

The lock claw 71 is capable of engaging with the first protrusion 521B of the developing cartridge 52. The push lever 73 is configured to abut against the second protrusion 521C of the developing cartridge 52. The drum cartridge 51 also includes a spring 74 that urges the lock member 70 from the unlock position toward the lock position.

The second side frame 511B of the drum cartridge 51 includes a stopper 515 configured to abut against the lock member 70. The stopper 515 has a first abutment surface 515A configured to abut the lock claw 71, and a second abutment surface 515B configured to abut against the push lever 73.

When the lock member 70 is pivotally moved toward the lock position and reach the lock position, the first abutment surface 515A abuts against the lock claw 71 to prevent the lock member 70 from pivotally moving any further. Further, when the lock member 70 is pivotally moved toward the unlock position to reach the same, the second abutment surface 515B abuts against the push lever 73 and prevents further pivotal movement of the lock member 70. In this way, the first abutment surface 515A and the second abutment surface 515B enables pivotal movement of the lock member 70 between the lock position and the unlock position reliably.

Figure 11:
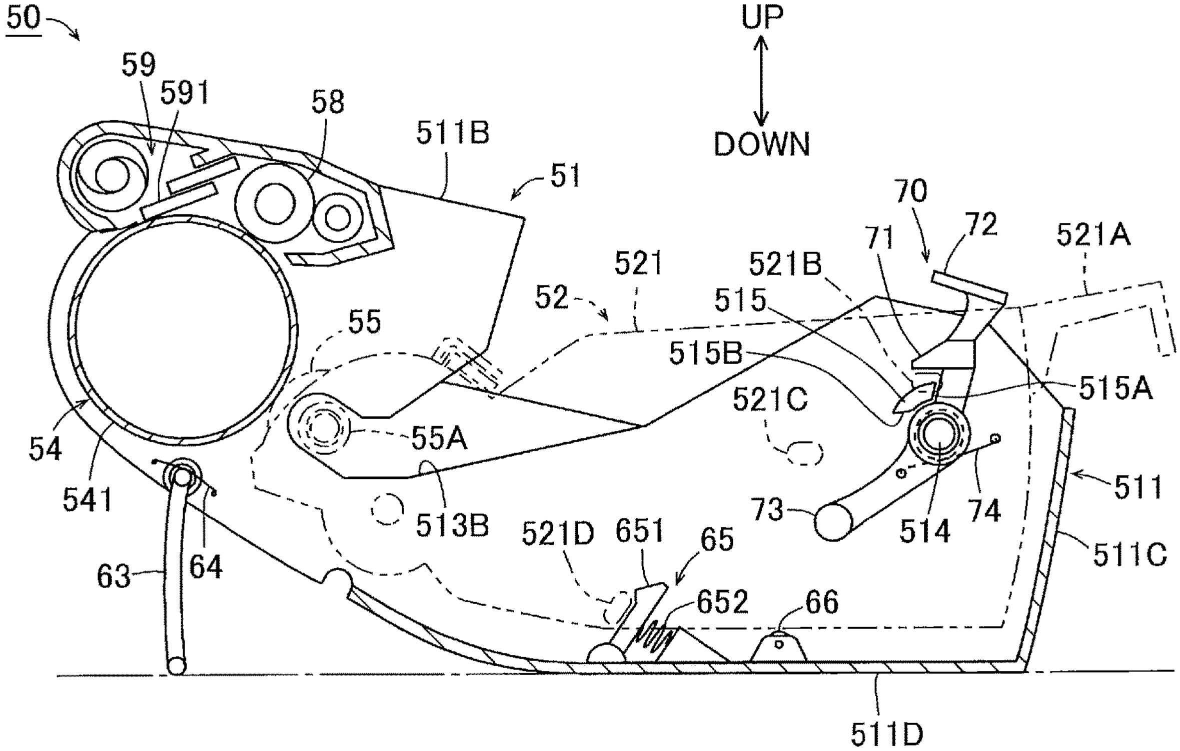
FIG. 11 is a cross-sectional view illustrating a state where a process cartridge including the drum cartridge and the developing cartridge in the image forming apparatus according to the embodiment is placed on a horizontal plane, and the developing cartridge is positioned at its second position.
Figure 12:
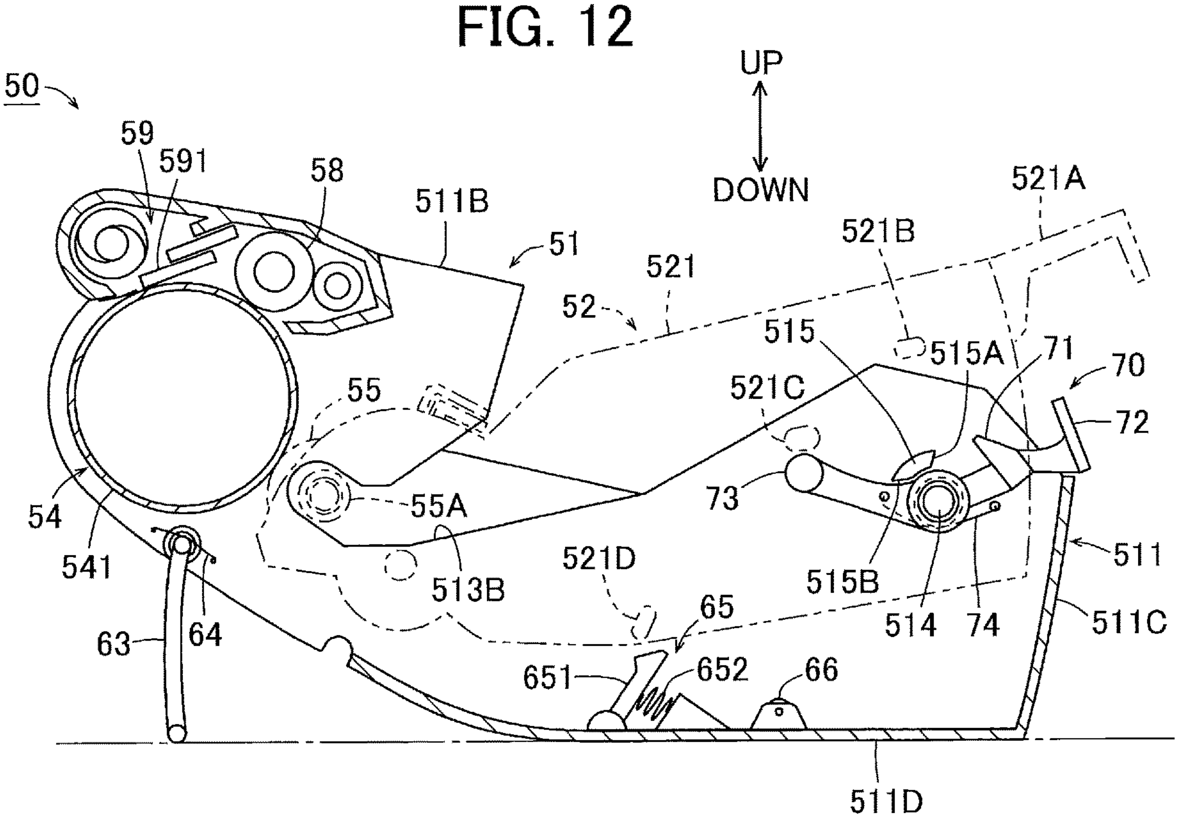
FIG. 12 is a cross-sectional view illustrating a state where the process cartridge in the image forming apparatus according to the embodiment is placed on a horizontal plane, and a lock member of the drum cartridge is positioned at its unlock position.

As illustrated in FIG. 11, when the lock member 70 is in the lock position, the lock claw 71 engages with the first protrusion 521B, and this engagement can prevent the developing cartridge 52 from moving from the second position to the first position. Meanwhile, as illustrated in FIG. 12, when the lock member 70 is in the unlock position, the lock member 70 is disengaged from the first protrusion 521B, and thus, the developing cartridge 52 is allowed to be moved from the second position to the first position.

The operation lever 72 is an operation member operated by the user configured to switch the position of the lock member 70 between the lock position and the unlock position. When the operation lever 72 is not operated and no force is applied to the operation lever 72 in its pivoting direction, the lock member 70 is in the lock position due to the urging force of the spring 74. As the operation lever 72 of the lock member 70 in the lock position is operated toward the unlock position, the lock member 70 is movable to the unlock position against the urging force of the spring 74.

In this way, by providing the lock member 70, movement of the developing cartridge 52 from the second position to the first position and resultant unintentional detachment of the developing cartridge 52 from the drum cartridge 51 can be prevented.

<Leg Portion>

The drum cartridge 51 also includes the leg 63. The leg 63 is movable between an expanding position (a position indicated by two-dotted chain lines in FIGS. 8 to 10) and a folded position (a position indicated by solid lines in FIGS. 8 to 10). The leg 63 expands from the drum frame 511 when the leg 63 is in the expanding position, whereas the leg 63 does not expand from the drum frame 511 when the leg 63 is in the folded position.

The leg 63 is urged by a spring 64 as an example of an urging member from the folded position toward the expanding position. The leg 63 is in the folded position against an urging force of the spring 64 in a state where the drum cartridge 51 is attached to the drawer 80. On the other hand, the leg 63 is in the expanding position due to the urging force of the spring 64 in a state where the drum cartridge 51 is detached from the housing 2.

With this configuration, when the drum cartridge 51 detached from the drawer 80 is placed on a worktable, the drum cartridge 51 can be supported stably using the leg 63.

<Pressure-Fixing Units>

Figure 7:
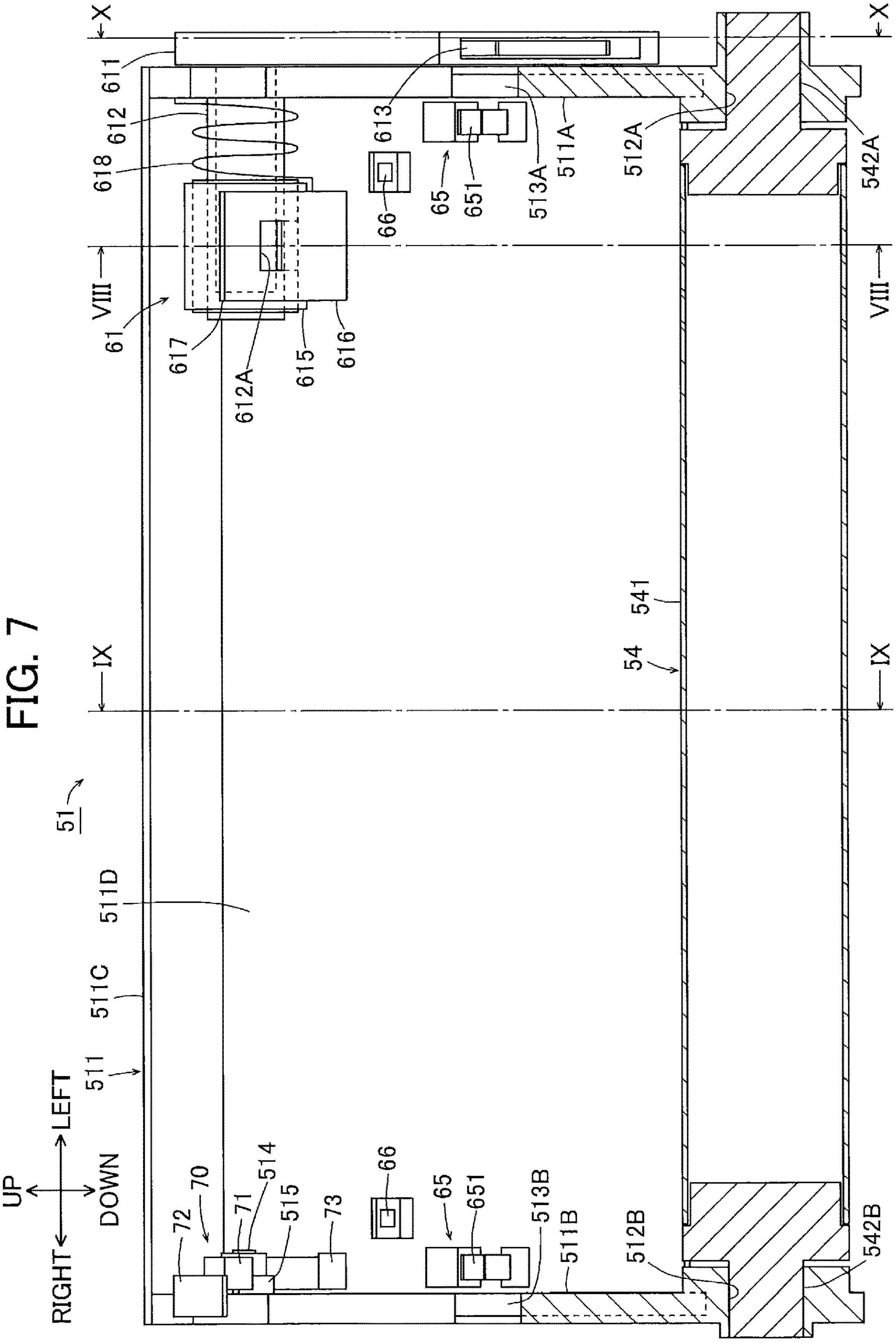
FIG. 7 is a cross-sectional view of the drum cartridge taken along a line VII-VII in FIG. 1.
Figure 8:
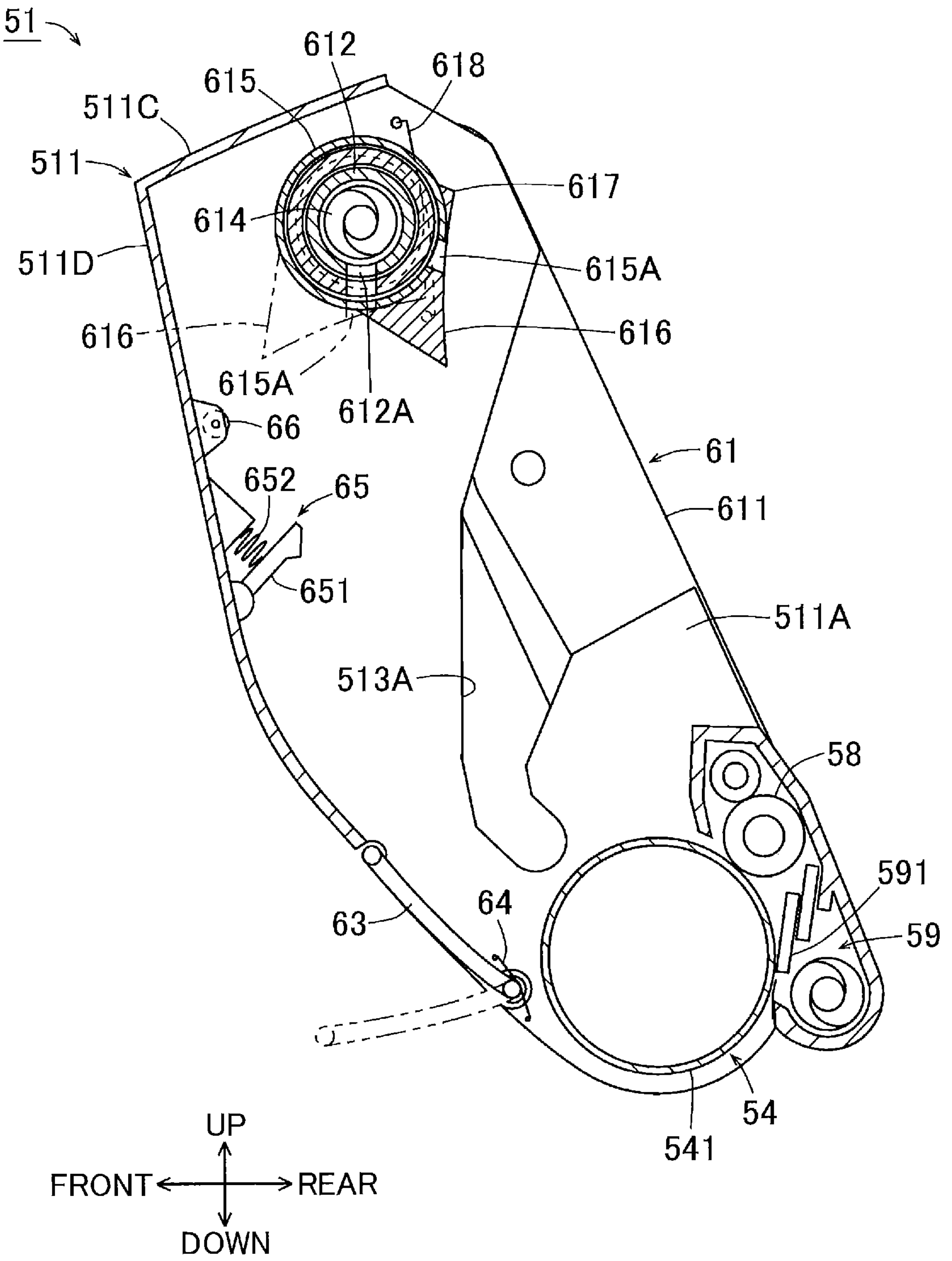
FIG. 8 is a cross-sectional view of the drum cartridge taken along a line VIII-VIII in FIG. 7.

As illustrated in FIGS. 8 and 9, the drum cartridge 51 further includes pressure-fixing units 65. The pressure-fixing units 65 are configured to press the developing cartridge 52 in a direction in which the developing roller 55 abuts against the photosensitive drum 54 and to fix the developing cartridge 52 in that position. As illustrated in FIG. 7, the pressure-fixing unit 65 are provided at respective left and right end portions on an inner surface of the front frame 511D.

Each of the pressure-fixing units 65 includes a lock arm 651 pivotably supported by the front frame 511D, and a spring 652 that urges the lock arm 651 rearward and downward. The lock arm 651 includes a claw provided at a position opposite the spring 652. The claws of the pressure-fixing units 65 can engage with the third protrusions 521D of the developing cartridge 52, respectively.

As illustrated in FIG. 11, as the third protrusions 521D of the developing frame 521 are pressed and fixed by the pressure-fixing units 65, respectively, the developing roller 55 is fixed so as to be movable in a direction in which the developing roller 55 is in pressure contact with the photosensitive drum 54. Therefore, the developing roller 55 supported by the developing frame 521 and the photosensitive drum 54 supported by the drum frame 511 can be maintained to an appropriate positional relationship suitable for developing. For example, even if the developing roller 55 is deformed at a certain amount, the positional relationship between the developing roller 55 and the photosensitive drum 54 can be suitably maintained.

As illustrated in FIGS. 7 to 9, the drum cartridge 51 further includes rollers 66 provided above the respective pressure-fixing units 65 on the front frame 511D. Each of the rollers 66 has a rotation axis parallel to the roller shaft 55A of the developing roller 55 attached to the drum cartridge 51. The rollers 66 make contact with a front surface of the developing frame 521 to support the developing frame 521 in the state where the developing cartridge 52 is in the second position. In addition, the rollers 66 can reduce a load applied to the developing cartridge 52 when the pressure-fixing units 65 move the developing cartridge 52 to realize smooth movement of the developing cartridge 52.

<Operations when Developing Cartridge is Attached to Drum Cartridge>

FIGS. 11 to 14 illustrate the process cartridge 50 detached from the drawer 80 and placed on a horizontal worktable while the front frame 511D of the drum frame 511 faces downward. Accordingly, in this state, the up-down direction of the process cartridge 50 when being attached to the drawer 80 is parallel to the horizontal direction. When the process cartridge 50 is placed on a horizontal workspace, the leg 63 is in the expanding position due to the urging force of the spring 64. Therefore, the process cartridge 50 is supported stably on the worktable by the front frame 511D of the drum frame 511 and the leg 63.

Figure 13:
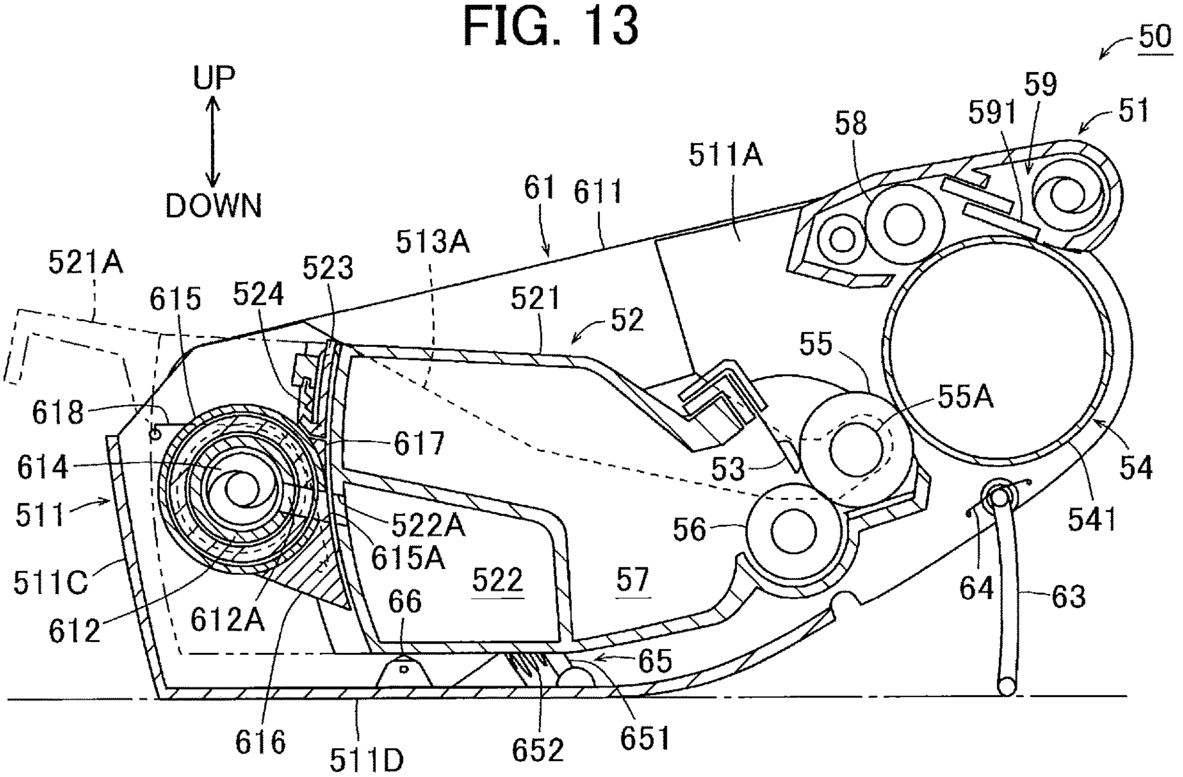
FIG. 13 is a cross-sectional view illustrating a state where the process cartridge in the image forming apparatus according to the embodiment is placed on a horizontal plane, and the developing cartridge is positioned at its second position.
Figure 14:
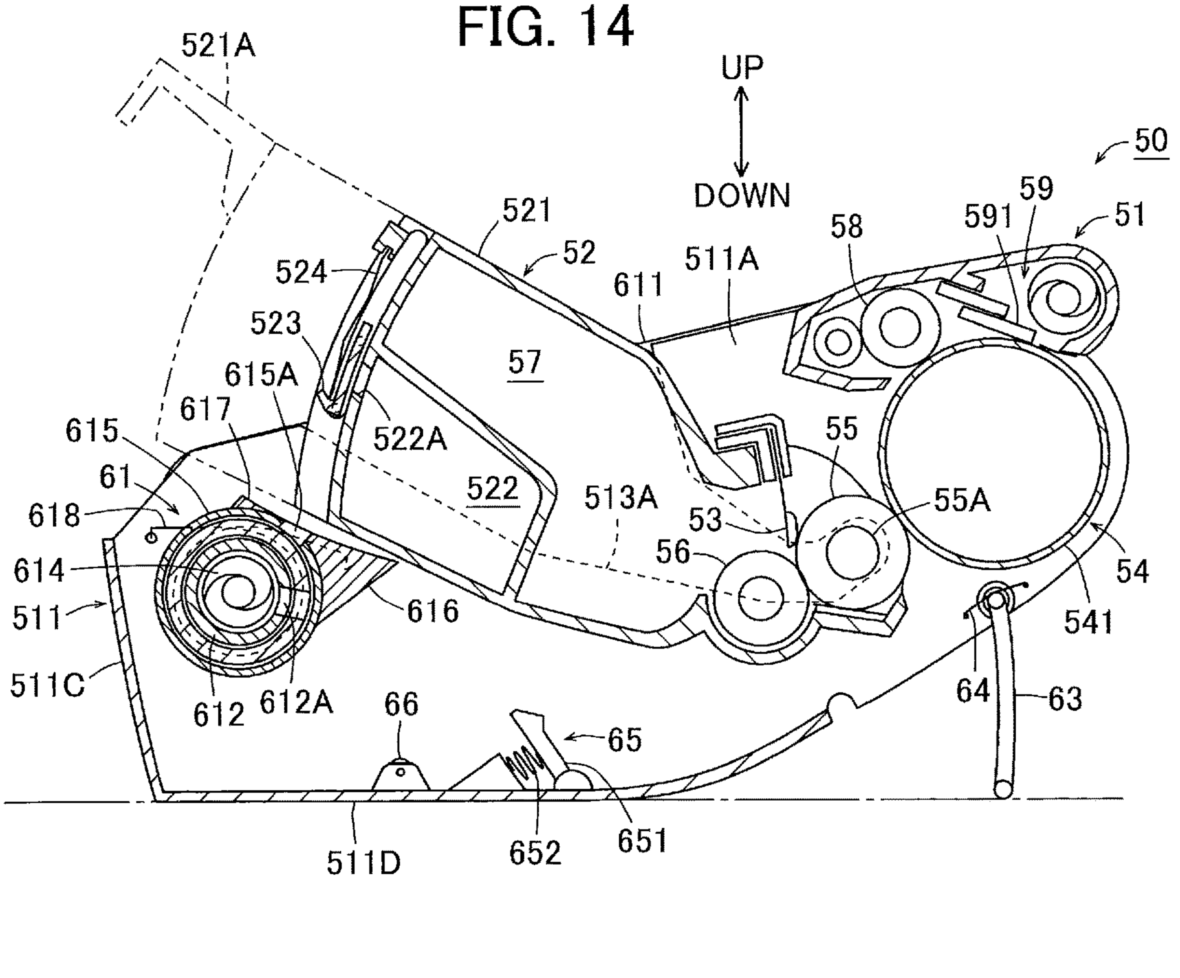
FIG. 14 is a cross-sectional view illustrating a state where the process cartridge in the image forming apparatus according to the embodiment is placed on a horizontal plane, and the developing cartridge is positioned at its first position.

FIGS. 11 and 13 illustrate a state where the developing cartridge 52 is in the second position, FIG. 12 illustrates a state where the developing cartridge 52 is pressed upward by the push lever 73, and FIG. 14 illustrates a state where the developing cartridge 52 is in the first position.

In a state where the developing cartridge 52 is attached to the drum cartridge 51, the developing cartridge 52 is pivotally movable between the first position and the second position about an axis of the roller shaft 55A of the developing roller 55 supported by the guide grooves 513A and 513B. This configuration can reduce a possibility that the developing roller 55 and the photosensitive drum 54 rub against each other to be damaged due to the pivotal movement of the developing cartridge 52 between the first position and the second position.

The developing cartridge 52 in the second position is accommodated in a space defined by the first side frame 511A, the second side frame 511B, the upper frame 511C, and the front frame 511D of the drum frame 511. As the developing cartridge 52 is pivotally moved from the second position to the first position, the developing cartridge 52 is moved upward to be pivotally moved away from the front frame 511D. In this way, the above configuration can make it easier to attach and detach the developing cartridge 52 to and from the drum cartridge 51 while the process cartridge 50 is placed on the worktable with the front frame 511D facing downward.

In the second position, the developing cartridge 52 is fixed to the drum cartridge 51 by the lock member 70 and the pressure-fixing units 65 as illustrated in FIG. 11, and is coupled to the residual toner conveyance portion 61 as illustrated in FIG. 13. As illustrated in FIG. 12, the developing cartridge 52 positioned between its second position and its first position is being pressed upward by the push lever 73 of the lock member 70 and spaced apart from the pressure-fixing units 65. In the first position, the developing cartridge 52 is spaced apart from the residual toner conveyance portion 61 as illustrated in FIG. 14.

How each component operates when the developing cartridge 52 is moved between the first position and the second position will be described below in detail.

<Operations of Lock Member>

As illustrated in FIG. 11, when the process cartridge 50 is placed on a horizontal surface, the operation lever 72 is positioned higher than the lock claw 71, and the lock member 70 in the lock position can be moved to the unlock position by pressing the operation lever 72 downward. Since the user only needs to press the operation lever 72 downward, the lock member 70 can be easily moved to the unlock position.

During the movement of the lock member 70 from the lock position to the unlock position, the push lever 73 abuts the second protrusion 521C to press the same upward, as illustrated in FIG. 12. As the second protrusion 521C is pressed upward, the developing cartridge 52 in the second position is pivotally moved upward about the axis of the roller shaft 55A of the developing roller 55.

Then, as illustrated in FIG. 14, the user can detach the developing cartridge 52 from the drum cartridge 51 by holding the handle 521A that has been moved upward and by pivotally moving the developing cartridge 52 further upward to the first position.

Conversely, when the developing cartridge 52 in the first position is to be moved to the second position, the user only needs to press the developing cartridge 52 downward. When the developing cartridge 52 is pressed downward, the second protrusion 521C presses the push lever 73 downward to pivotally move the lock member 70 from the unlock position to the lock position, and thus the lock claw 71 engages with the first protrusion 521B.

<Operations of Pressure-Fixing Units>

As illustrated in FIG. 11, when the process cartridge 50 is placed on a horizontal surface, the pressure-fixing units 65 push and fix the respective third protrusions 521D of the developing frame 521 in position. When the operation lever 72 is pressed downward from this state and the developing cartridge 52 is pivotally moved upward, the third protrusions 521D are also moved upward to be away from the pressure-fixing units 65 against a fixing force of the pressure-fixing units 65.

Conversely, when the developing cartridge 52 in the first position is to be moved to the second position, the user presses the developing cartridge 52 downward. Accordingly, the pressure-fixing units 65 are pressed by the corresponding third protrusions 521D that are moved downward to engage with the same.

<Operations of Inlet Port Shutter and Residual Toner Conveyance Shutter>

As illustrated in FIG. 14, when the developing cartridge 52 attached to the drum cartridge 51 is in the first position, the inlet port shutter 523 is in the inlet port closing position due to the urging force of the spring 524. In addition, the first abutment piece 616 does not abut against the developing cartridge 52, and the residual toner conveyance shutter 615 is in the discharge port closing position.

When the developing cartridge 52 is pivotally moved from this state to the second position relative to the drum cartridge 51, the second abutment piece 617 abuts against the inlet port shutter 523, and this causes the inlet port shutter 523 to be moved to the inlet port opening position against the urging force of the spring 524 as illustrated in FIG. 13, thereby opening the inlet port 522A.

At the same time, the first abutment piece 616 abuts against the developing cartridge 52 to move the residual toner conveyance shutter 615 to the discharge port opening position against the urging force of the spring 618, thereby opening the residual toner discharge port 612A. With the above configuration, the residual toner discharge port 612A is brought into communication with the inlet port 522A, and residual toner conveyed toward the residual toner discharge port 612A is discharged into the residual toner container 522 through the residual toner discharge port 612A and the inlet port 522A.

Conversely, when the developing cartridge 52 in the second position is to be pivotally moved to the first position relative to the drum cartridge 51, the second abutment piece 617 separates from the inlet port shutter 523, and thus the inlet port shutter 523 is moved back to the inlet port closing position due to the urging force of the spring 524 to close the inlet port 522A. Further, the first abutment piece 616 separates from the developing cartridge 52 to cause the residual toner conveyance shutter 615 to be moved back to the discharge port closing position due to the urging force of the spring 618. Accordingly, the residual toner discharge port 612A is closed.

In the state illustrated in FIG. 13, residual toner stored in the residual toner container 522 accumulates in a lower portion of the residual toner container 522 away from the inlet port 522A due to the gravitational force. Therefore, the residual toner in the residual toner container 522 is less likely to be spilled through the inlet port 522A when the developing cartridge 52 is attached to or detached from the drum cartridge 51.

<Drawer>

The drawer 80 is movable in the front-rear direction between an inner position (a position illustrated in FIG. 1) where the drawer 80 is accommodated in the housing 2 and an outer position (a position illustrated in FIG. 18) where a portion of the drawer 80 is exposed to an outside of the housing 2. As illustrated in FIG. 1, when the process cartridges 50 are attached to the drawer 80 and the drawer 80 is in the inner position, the process cartridges 50 are accommodated in the housing 2.

Meanwhile, when the process cartridges 50 are attached to the drawer 80 and the drawer 80 is in the outer position, at least a portion of each process cartridge 50 is exposed to the outside of the housing 2.

As described above, the process cartridges 50 can be attached to and detached from the drawer 80. The drawer includes side frames 81, and four guide grooves 81A are formed in each of the side frames 81 of the drawer 80. The guide grooves 81A extend substantially in the up-down direction and are curved rearward from the upper side to the lower side.

Each of the guide grooves 81A has an upper end that is open at an upper end of the drawer 80. The support portions 512A and 512B of the drum frame 511 of each drum cartridge 51 can be inserted into the guide grooves 81A, respectively, via the upper ends. Each of the process cartridges 50 can be attached to the drawer 80 by inserting the support holes 512A and 512B into the corresponding guide grooves 81A.

<Detachment of Process Cartridge from Drawer and Developing Cartridge from Drum Cartridge>

As illustrated in FIG. 19, in the four process cartridges 50 attached to the drawer 80, the frontmost process cartridge 50 in the front-rear direction is referred to as "first process cartridge 50-1", the process cartridge 50 to the rear of the first process cartridge 50-1 is referred to as "second process cartridge 50-2", the process cartridge 50 to the rear of the second process cartridge 50-2 is referred to as "third process cartridge 50-3", and the process cartridge 50 to the rear of the third process cartridge 50-3 (the rearmost process cartridge 50 in the front-rear direction) is referred to as "fourth process cartridge 50-4".

The first process cartridge 50-1 includes a first drum cartridge 51-1 and a first developing cartridge 52-1. The second process cartridge 50-2 includes a second drum cartridge 51-2 and a second developing cartridge 52-2. The third process cartridge 50-3 includes a third drum cartridge 51-3 and a third developing cartridge 52-3. The fourth process cartridge 50-4 includes a fourth drum cartridge 51-4 and a fourth developing cartridge 52-4.

The first drum cartridge 51-1 includes a first drum frame 511-1, a first photosensitive drum 54-1, and a first lock member 70-1. The second drum cartridge 51-2 includes a second drum frame 511-2, a second photosensitive drum 54-2, and a second lock member 70-2. The third drum cartridge 51-3 includes a third drum frame 511-3, a third photosensitive drum 54-3, and a third lock member 70-3. The fourth drum cartridge 51-4 includes a fourth drum frame 511-4, a fourth photosensitive drum 54-4, and a fourth lock member 70-4.

The first lock member 70-1 includes a first lock claw 71-1 and a first operation lever 72-1. The second lock member 70-2 includes a second lock claw 71-2 and a second operation lever 72-2. The third lock member 70-3 includes a third lock claw 71-3 and a third operation lever 72-3. The fourth lock member 70-4 includes a fourth lock claw 71-4 and a fourth operation lever 72-4.

The first developing cartridge 52-1 includes a first developing frame 521-1 and a first developing roller 55-1. The second developing cartridge 52-2 includes a second developing frame 521-2 and a second developing roller 55-2. The third developing cartridge 52-3 includes a third developing frame 521-3 and a third developing roller 55-3. The fourth developing cartridge 52-4 includes a fourth developing frame 521-4 and a fourth developing roller 55-4.

The second process cartridge 50-2 is attachable to and detachable from the drawer 80. When attached to the drawer

80, the second process cartridge 50-2 is positioned adjacent to the first process cartridge 50-1 attached to the drawer 80. Since the image forming apparatus 1 includes the first process cartridge 50-1, the second process cartridge 50-2, the third process cartridge 50-3, and the fourth process cartridge 50-4, the image forming apparatus 1 can form a multicolor image.

As illustrated in FIG. 18, in the image forming apparatus 1, the process cartridges 50 attached to the drawer 80 can be detached from the drawer 80 when the front cover 22 is in the open position and the drawer 80 is in the outer position. Specifically, the user can detach the process cartridge 50, in which the developing cartridge 52 has been attached to the drum cartridge 51, from the drawer 80 by holding the handle 521A of the developing cartridge 52.

In such a configuration, a case where the first developing cartridge 52-1 is to be moved from the second position (the position indicated by a solid line in FIG. 19) toward the first position (the position indicated by a two-dotted chain line in FIG. 19) in a state where the second process cartridge 50-2 and the first process cartridge 50-1 in which the first developing cartridge 52 is attached to the first drum cartridge 51-1 and positioned at the second position are attached to the drawer 80 is assumed while referring to FIG. 19. In this case, even when the first developing cartridge 52-1 tries to be moved toward the first position, the first developing cartridge 52-1 interferes with the second drum frame 511-2 of the second process cartridge 50-2 before the first developing cartridge 52-1 reaches the first position, and thus the first developing cartridge 52-1 cannot reach the first position.

That is, the above-described configuration does not allow the user to replace the first developing cartridge 52-1 by "the method in which the developing cartridge is replaced while the process cartridge is attached to the drawer", and the user can reliably perform the replacing process by "the method in which the developing cartridge is replaced after the process cartridge is detached from the drawer". Accordingly, with the above configuration, the user does not have difficulty in determining that which one of "the method in which the developing cartridge is replaced while the process cartridge is attached to the drawer" and "the method in which the developing cartridge is replaced after the process cartridge is detached from the drawer" is appropriate.

Furthermore, clearance between the first process cartridge 50-1 and the second process cartridge 50-2 is small to the extent that the first developing cartridge 52-1 interferes with the second process cartridge 50-2 when the first developing cartridge 52-1 tries to be moved from the second position toward the first position in the state where the second process cartridge 50-2 and the first process cartridge 50-1 in which the first developing cartridge 52-1 has been attached to the first drum cartridge 51-1 are attached to the drawer 80. Accordingly, the size of the image forming apparatus 1 can be small.

The above description can also be applied to the relationship between the second process cartridge 50-2 and the third process cartridge 50-3 and to the relationship between the third process cartridge 50-3 and the fourth process cartridge 50-4. With regard to the fourth process cartridge 50-4, when the fourth developing cartridge 52-4 tries to be moved from the second position toward the first position in a state where the fourth process cartridge 50-4 is attached to the drawer 80, the fourth developing cartridge 52-4 interferes with the drawer 80 before the fourth developing cartridge 52-4 reaches the first position. Therefore, the fourth developing cartridge 52-4 also cannot reach the first position.

Further, in the state illustrated in FIG. 19, the drawer 80 is in the outer position, the first process cartridge 50-1 and the second process cartridge 50-2 are supported by the drawer 80, and the first lock member 70-1 is in the lock position in the image forming apparatus 1. In this state, the first operation lever 72-1 of the first lock member 70-1 protrudes further rearward than the first drum cartridge 51-1 and is positioned to be interposed between the first process cartridge 50-1 and the second process cartridge 50-2 in the front-rear direction.

With the above configuration, the first operation lever 72-1 can be operated less easily while the first process cartridge 50-1 is attached to the drawer 80. Thus, the locked state of the first lock member 70-1 is not allowed to be easily canceled.

In the image forming apparatus 1 in the state illustrated in FIG. 19, the first operation lever 72-1 in the unlock position (the position indicated by a dashed-two-dotted line in FIG. 19) is positioned higher than the first operation lever 72-1 in the lock position (the position indicated by a solid line in FIG. 19).

Further, in the image forming apparatus 1 in the state illustrated in FIG. 19, the upper frame 511C of the first drum cartridge 51-1 covers at least a portion of an upper surface of the first developing cartridge 52-1.

With the image forming apparatus configured as described above, at least a portion of the upper surface of the first developing cartridge 52-1 can be covered using the upper frame 511C of the first drum cartridge 51-1 when the drawer 80 is in the outer position. This configuration can make the user difficult to grasp the first developing cartridge 52-1. Consequently, the user can be led more reliably to "the method in which the developing cartridge is replaced after the process cartridge is detached from the drawer".

In the image forming apparatus 1 in the state illustrated in FIGS. 18 and 19, assuming that the operation lever 72 can be operated easily, there is a likelihood that the user operates the operation lever 72 while the process cartridge 50 is attached to the drawer 80 to cause the drawer 80 to be pressed downward. In this case, the problem arises that, by the drawer 80 being pressed downward, the image forming apparatus 1 as a whole is likely to be inclined frontward.

In this respect, with the configuration according to the present embodiment, the process cartridge 50 is pulled out upward while the drawer 80 is in the outer position to be detached from the drawer 80, and then placed on a worktable. In this state, the operation lever 72 is operated to separate the drum cartridge 51 and the developing cartridge 52 from each other. Accordingly, the above configuration can prevent the user from operating the operation lever 72 while the drawer 80 to which the process cartridge 50 has been attached is in the outer position, and can prevent the drawer 80 from being pushed downward. That is, the image forming apparatus 1 according to the embodiment provides an advantage in that the image forming apparatus 1 as a whole is less likely to be inclined frontward.

<Support Structure of Drum Cartridges and Drawer>

As illustrated in FIG. 15, the housing 2 further includes vertical frames 24 each extending in the front-rear direction and the up-down direction. The vertical frames 24 are disposed at respective right and left end portions within the housing 2. As illustrated in FIGS. 15 to 18, each of the vertical frames 24 is formed with two guide holes 24A. Each of the guide holes 24A is in a form of a long hole extending substantially in the front-rear direction, and is inclined upward from the rear side to the front side. The two guide holes 24A in each of the vertical frames 24 are formed to be arranged in the front-rear direction.

A pair of drawer guides 85 are provided on respective inner sides of the vertical frames 24 of the housing 2 in the left-right direction. Each of the drawer guides 85 is a rail member extending in the front-rear direction. The right and left side frames 81 of the drawer 80 are supported by the right and left drawer guides 85, respectively, to be movable the front-rear direction.

Each of the drawer guides 85 includes guide pins 85A each protrudes outward in the left-right direction. The guide pins 85A are provided corresponding to the guide holes 24A of the vertical frame 24 and are slidably disposed inside the corresponding guide holes 24A. As the guide pins 85A are inserted through the corresponding guide holes 24A, the drawer guides 85 are supported by the vertical frames 24, respectively. The drawer guides 85 are movable in the front-rear direction and the up-down direction relative to the vertical frames 24 within a range in which the guide pins 85A is slidingly movable inside the corresponding guide holes 24A.

Each of the drawer guides 85 has a front end portion having an engagement pin 85B that protrudes outward in the left-right direction. In the meantime, the housing 2 further includes link arms 27. Each of the link arms 27 has a circular arc shape that curves out rearward and downward from the front cover 22 when the front cover 22 is in the closed position. Each of the link arms 27 includes an engagement hole 27A that can engage with the corresponding engagement pin 85B. Each of the engagement holes 27A has a circular arc shape that curves out downward from the front side to the rear side when the front cover 22 is in the closed position in conformity to the shape of the link arms 27.

With the above configuration, the drawer 80 is movable between the inner position (a position illustrated in FIG. 17) and the outer position (a position illustrated in FIG. 18) in the front-rear direction. In other words, a moving direction in which the drawer 80 is movable is the front-rear direction, and the outer position of the drawer 80 in the moving direction of the drawer 80 is denoted as the front side, while the inner position of the drawer 80 in the moving direction of the drawer 80 is denoted as the rear side.

In the meantime, the drawer guides 85 are movable in the front-rear direction between a positioning position (a position illustrated in FIG. 16) where the process cartridges 50 are fixed in position relative to the housing 2 and a non-positioning position (a position illustrated in FIG. 17) where the process cartridges 50 are not fixed in position relative to the housing 2 and thus the drawer 80 is allowed to be moved in the front-rear direction.

Figure 16:
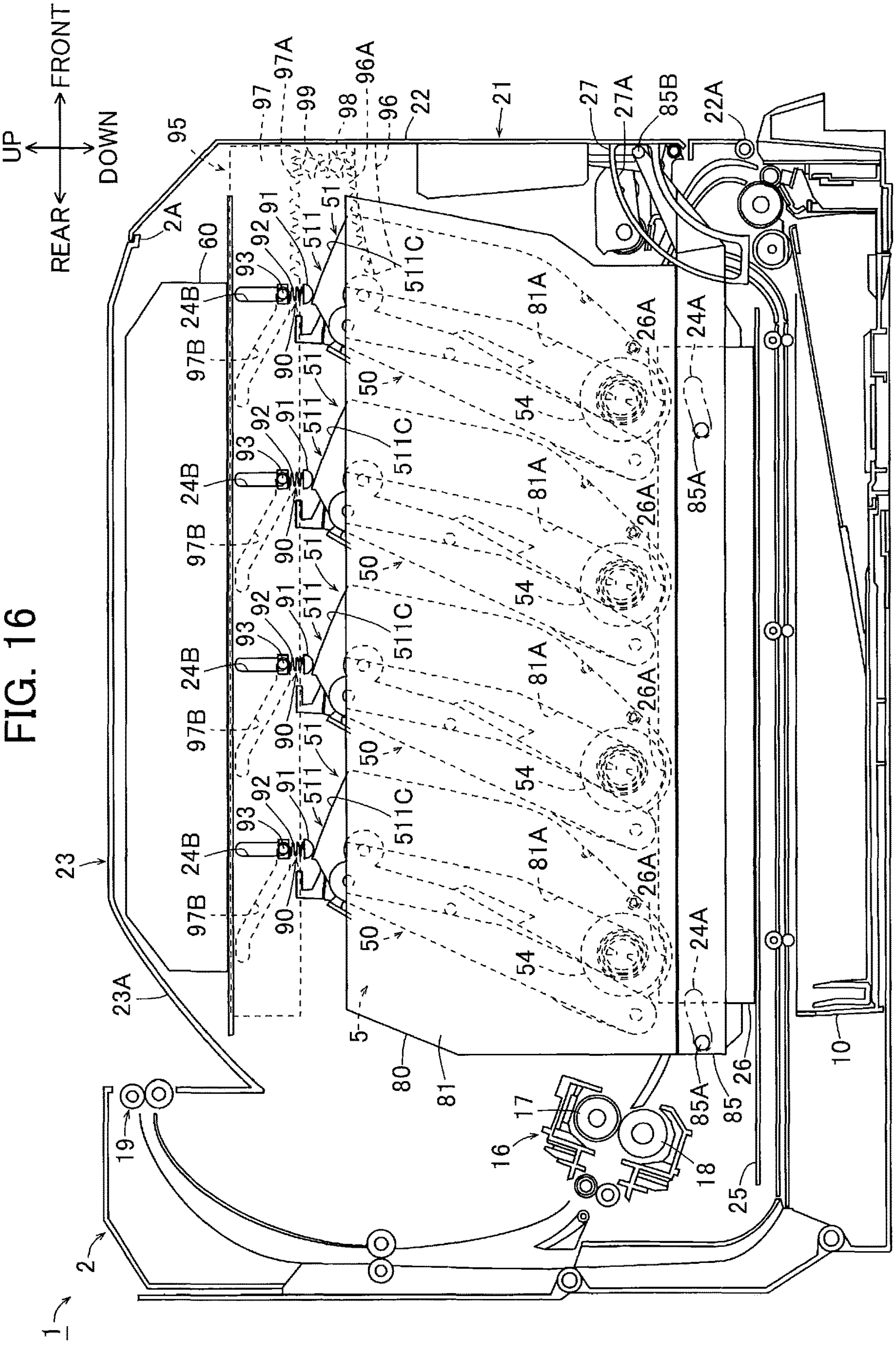
FIG. 16 is a cross-sectional view of the image forming apparatus according to the embodiment taken along a line XVI-XVI in FIG. 15, and illustrating a state where a front cover is in its closed position.

As illustrated in FIG. 16, when the front cover 22 of the housing 2 is closed, the drawer 80 is in the inner position and the drawer guides 85 are in the positioning position. When the drawer guides 85 are in the positioning position, the guide pins 85A are positioned at rear end portions of the respective guide holes 24A. Thus, the drawer guides 85 are positioned in lower-rear position within their movable ranges.

The housing 2 also includes a lateral frame 25 that extends in the horizontal direction at a position between the right and left vertical frames 24. The lateral frame 25 is disposed below the drawer guides 85. A pair of right and left support plates 26 are erected on the lateral frame 25. Each of the support plates 26 has a plate-like shape that extends in the front-rear direction. The support plates 26 are disposed inward in the left-right direction than the respective side frames 81 of the drawer 80.

As illustrated in FIGS. 15 and 16, each of the support plates 26 has an upper end formed with four positioning recessed portions 26A. The positioning recessed portions 26A are formed in the lateral plates 26 so as to correspond to positions in the front-rear direction of the respective process cartridges 50. As illustrated in FIG. 15, when the drawer guides 85 are in the positioning position, a lower end portion of the first side frame 511A and a lower end portion of the second side frame 511B of the drum frame 511 of the drum cartridge 51 are supported by the corresponding positioning recessed portions 26A, respectively, from below. Since the drum frames 511 are supported by the positioning recessed portions 26A, the drum cartridges 51 are fixed in position relative to the housing 2.

The right and left support plates 26 are formed of sheet metal members press-worked in an identical mold and thus have shapes identical to each other. Therefore, the photosensitive drums 54 can be positioned with high accuracy when the drum cartridges 51 are fixed in position relative to the housing 2.

In this manner, the process cartridges 50 are supported by the support plates 26 from below when the drawer guides 85 are in the positioning position so that the process cartridges 50 can be fixed in position relative to the housing 2.

Figure 17:
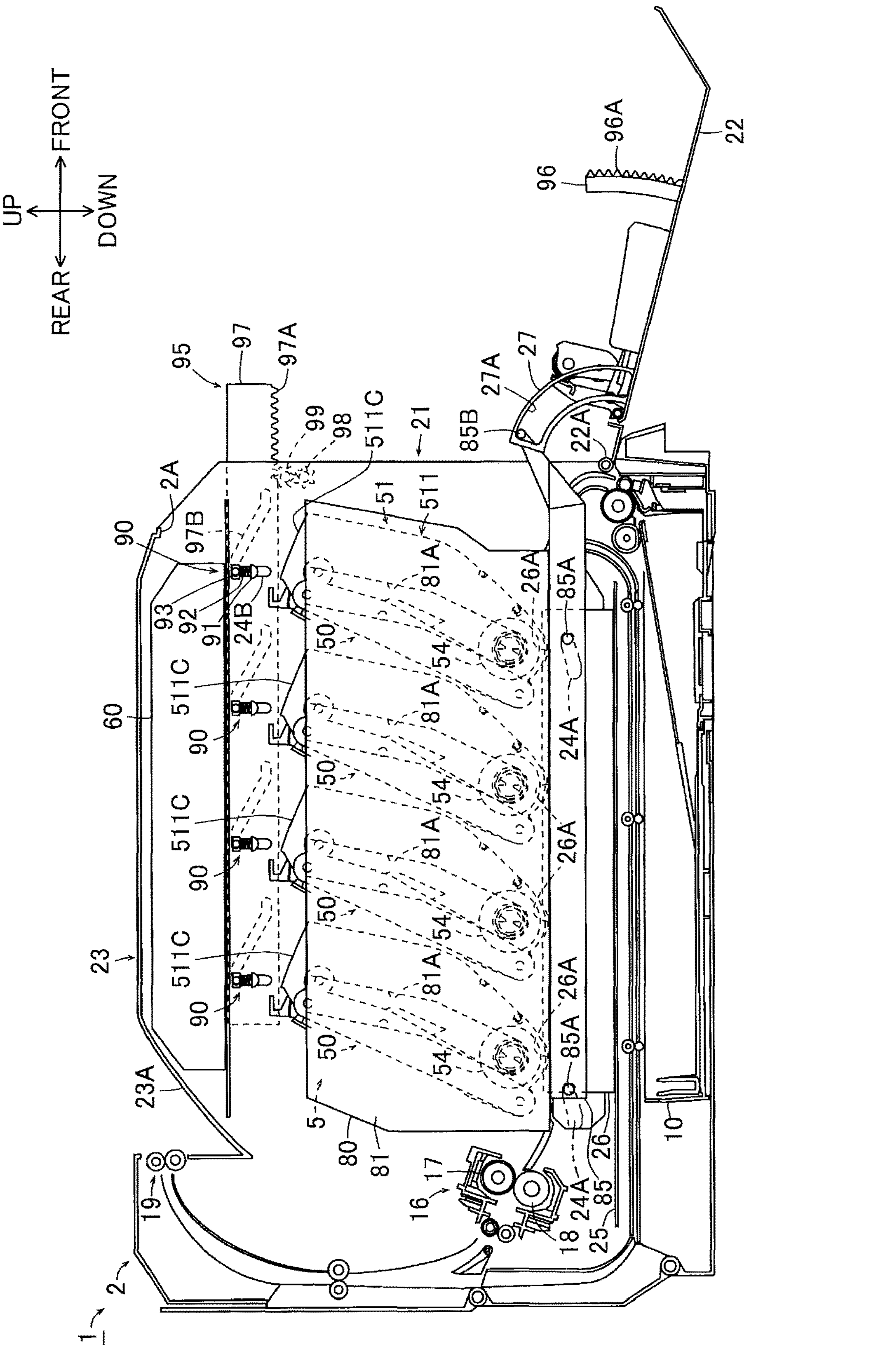
FIG. 17 is a cross-sectional view of the image forming apparatus according to the embodiment taken along the line XVI-XVI in FIG. 15, and illustrating a state where the front cover is in its open position and a drawer is in its inner position.

When the front cover 22 of the housing 2 is open from the state illustrated in FIG. 16, the link arms 27 are moved frontward and the engagement pins 85B engage with respective rear ends of the engagement holes 27A to cause the drawer guides 85 to be pulled frontward, as illustrated in FIG. 17. The drawer guides 85 pulled frontward are moved frontward to the non-positioning position.

At this time, the guide pins 85A are slidingly moved from the rear ends to front ends in the respective guide holes 24A as the drawer guides 85 are moved frontward, thereby moving the drawer guides 85 upward as well.

In accordance with the frontward and upward movement of the drawer guides 85, the drawer 80 supported by the drawer guides 85 is moved upward along with the process cartridges 50. This movement of the drawer 80 causes the process cartridges 50 to be move upward away from the support plates 26, whereby the process cartridges 50 are no longer supported by the support plates 26.

The drawer 80 is moved directly upward without moving frontward as the drawer guides 85 are moved frontward and upward. The process cartridges 50 supported by the drawer 80 are also moved directly upward. Since the process cartridge 50 are moved upward in this way, the photosensitive drums 54 provided in the process cartridges 50 does not rub against the belt 31 in the front-rear direction, thereby suppressing the photosensitive drums 54 and the belt 31 from being damaged.

As described above, when the drawer guides 85 are in the non-positioning position, the process cartridges 50 are not supported by the support plates 26, and thus the process cartridges 50 are not fixed in positioned relative to the housing 2 to allow the movement of the drawer 80 in the front-rear direction.

As illustrated in FIG. 18, the user can move the drawer 80 to the outer position by pulling the drawer 80 in the inner position frontward while the front cover 22 is open and the drawer 80 is movable in the front-rear direction.

In the state where the drawer 80 is in the outer position, each process cartridge 50 (the drum cartridge 51 and the developing cartridge 52) exposed to the outside of the housing 2 can be attached to or detached from the drawer 80.

Meanwhile, the user can move the drawer 80 to the inner position by pushing the drawer 80 in the outer position rearward. Furthermore, when the front cover 22 is closed from the state where the front cover 22 is open and the drawer guides 85 are in the non-positioning position, the engagement pins 85B are brought into engagement with front ends of the engagement holes 27A, and thus the drawer guides 85 are pressed rearward to be moved rearward to the positioning position.

[Pressing Members and Interlocking Mechanisms]

As illustrated in FIGS. 15 to 18, the image forming apparatus 1 further includes pressing members 90 configured to press the respective drum frames 511 and interlocking mechanisms 95 configured to move the pressing members 90 in interlocking relation to the opening and closing movement of the front cover 22.

<Pressing Members>

As illustrated in FIG. 16, one pressing member 90 is provided for each of the process cartridges 50. Thus, the four pressing members 90 are provided. As illustrated in FIG. 15, each of the pressing members 90 includes hemispherical pressing portions 91 configured to abut against the drum frame 511, springs 92 having lower ends fixed to the respective pressing portions 91, and a support member 93 having a rod-like shape that extends in the left-right direction. The support member 93 supports upper ends of the springs 92. The pressing portions 91 and the springs 92 are respectively provided near right and left ends of the support member 93.

The support member 93 has right and left end portions inserted through guide holes 24B formed in the vertical frames 24 of the housing 2, respectively, to be supported by the vertical frames 24. Each of the guide holes 24B is a long hole extending in the up-down direction as illustrated in FIG. 16. The guide holes 24B are formed at positions between the exposure unit 60 and the process cartridges 50 in the up-down direction. Four guide holes 24B are formed in each of the vertical frames 24 to be arrayed in the front-rear direction so that these guide holder 24B are positioned directly above right and left end portions of the upper frames 511C of the respective drum frames 511 in the state illustrated in FIG. 16.

Since the both right and left end portions of the support members 93 are inserted through the guide holes 24B, the pressing members 90 are supported by the vertical frames 24. Each of the pressing members 90 is movable in the up-down direction relative to the vertical frames 24 within a range in which the support member 93 is slidingly movable inside the guide holes 24B.

When the pressing member 90 (the support member 93) is positioned in upper end portions of the respective guide holes 24B, the pressing member 90 is in a separated position (a position illustrated in FIG. 17) where the pressing member 90 is separated from the upper frame 511C of the corresponding drum cartridge 51. Meanwhile, when the pressing member 90 (the support member 93) is positioned in lower end portions of the respective guide holes 24B, the pressing member 90 is in a pressing position (a position illustrated in FIG. 16) where the pressing member 90 can press the upper frame 511C of the corresponding drum cartridge 51.

<Interlocking Mechanisms>

As illustrated in FIG. 16, each of the interlocking mechanisms 95 includes a first rack 96 provided on the front cover 22, a second rack 97 disposed on an outer surface of the corresponding vertical frame 24, a first pinion 98 provided on the outer surface of the vertical frame 24 and configured to meshingly engage with the first rack 96, and a second pinion 99 provided on the outer surface of the corresponding vertical frame 24 and configured to meshingly engage with the first pinion 98 and the second rack 97. The interlocking mechanism 95 is provided at each of the right and left sides inside the image forming apparatus 1.

In the state illustrated in FIG. 16, the first racks 96 are plate members that is provided at respective left and right end portions of the inner surface of the front cover 22, and have circular arc shapes along the radius of the pivotal movement of the front cover 22 and extend substantially rearward. Each of the first racks 96 has teeth 96A formed along an upper surface of the circular arc shaped body of the first rack 96 in the state of FIG. 16.

Each of the second racks 97 is a plate member that has a substantially rectangular shape that extends horizontally from the front end portion of the housing 2 toward a portion in the vicinity of a rear end portion of the drawer 80. Each of the second racks has teeth 97A formed along a lower surface of a front end portion of the rectangular shape body of the second rack 97.

Each of the second rack 97 is formed with four guide holes 97B. The four guide holes 97B are arrayed in the front-rear direction in each of the second rack 97 to correspond to the pressing members 90. Each of the guide holes 97B is in a form of a long hole extending substantially in the front-rear direction, and is inclined upward from the front side to the rear side. Each of the guide holes 97B has a length in the up-down direction equal to a length in the up-down direction of each of the guide holes 24B formed in the vertical frames 24.

Within the guide holes 97B, the right and left end portions of the support member 93 of the corresponding pressing member 90 are slidably disposed at positions outward of the vertical frames 24 in the left-right direction. Since the support members 93 are inserted through the respective guide holes 97B, the second racks 97 are supported by the support members 93. Accordingly, when the second racks 97 are moved in the front-rear direction, the support members 93 are guided along the guide holes 97B and are moved in the up-down direction relative to the vertical frames 24.

Each of the first pinion 98 is provided on a front end portion of the housing 2 at a position outward of the corresponding vertical frame 24. The first pinion 98 meshingly engages with a front end portion of the teeth 96A of the corresponding first rack 96 in the state illustrated in FIG. 16 and is rotatable in response to the movement of the corresponding first rack 96. In other words, the first pinion 98 is rotatable in interlocking relation to the opening and closing movement of the front cover 22.

Each of the second pinions 99 is provided on the front end portion at the position outward of the corresponding vertical frame 24 and above the corresponding first pinion 98. In the state illustrated in FIG. 16, the second pinion 99 has lower end portion engaging with the corresponding first pinion 98, and upper end portion engaging with a front end portion of the teeth 97A of the corresponding second rack 97. With this configuration, the second pinion 99 is rotatable in response to the rotation of the corresponding first pinion 98 to move the corresponding second rack 97 in the front-rear direction. In other words, the second rack 97 is movable in interlocking relation to the opening and closing movement of the front cover 22.

<Operations of Pressing Members and Interlocking Mechanisms>

FIG. 16 illustrates a state where the drum cartridges 51 are attached to the drawer 80, the developing cartridges 52 are attached to the respective drum cartridges 51, the drawer 80 is in the inner position, and the front cover 22 is in the closed position. In this state, the pressing members 90 press the upper portions of the upper frames 511C of the corresponding drum cartridges 51 downward.

Specifically, the second racks 97 are located at rearmost positions in their movable ranges in the front-rear direction, and thus the support members 93 are guided to front end portions of the corresponding guide holes 97B to be positioned at the lower ends of the corresponding guide holes 24B. The movement of the support members 93 in the up-down direction in this state is regulated by the respective guide holes 97B. Thus, the pressing portions 91 abut against the upper portions of the respective upper frames 511C and press the same downward due to the urging force of the springs 92.

As the drum frames 511 are pressed downward, the lower end portions of the first side frames 511A and the lower end portions of the second side frames 511B of the drum frames 511 are fixed in position by the corresponding positioning recessed portions 26A in the support plates 26 (see FIG. 15). By disposing the pressing members 90 above the respective upper frames 511C in this way, the drum frames 511 can be pressed downward to accurately position the photosensitive drums 54. Further, with the above configuration, the pressing members 90 can be provided at positions above the developing cartridges 52 where the pressing members 90 can be easily provided.

In the state illustrated in FIG. 16, the pressing members 90 are positioned higher than upper end portions of the respective residual toner conveyance portions 61. Therefore, the pressing members 90 do not interfere with the residual toner conveyance portions 61.

When the front cover 22 is moved toward the open position from the state illustrated in FIG. 16, the first racks 96 are moved frontward to cause the first pinions 98 and the second pinions 99 to be rotated, thereby moving the second racks 97 frontward. In accordance with the frontward movement of the second racks 97, the support members 93 are guided from the front end portions to rear end portions of the corresponding guide holes 97B and are moved upward from the lower end portions to the upper end portions of the corresponding guide holes 24B.

Then, during the movement of the front cover 22 toward its open position, rear ends of the first racks 96 are moved away from the respective first pinions 98 to cause the first pinions 98 and the second pinions 99 to stop rotating, and the movement of the second racks 97 stop while the second pinions 99 are located at rear end portions of the teeth 97A of the respective second racks 97. Thereafter, as illustrated in FIG. 17, the front cover 22 reaches the open position.

At a time when the second racks 97 stop moving, the rear end portions of the guide holes 97B reach the corresponding support members 93, and the support members 93 has moved up to the upper end portions of the corresponding guide holes 24B to place the pressing members 90 in their separated position (the position illustrated in FIG. 17) where the pressing members 90 are spaced apart from the corresponding upper frames 511C. When the front cover 22 is moved from the open position to the closed position, the above-described operation is reversed.

As described above, when the front cover 22 is in the open position, the interlocking mechanisms 95 retain the pressing members 90 in their separated position where the pressing members 90 are spaced apart from the corresponding upper frames 511C. Meanwhile, when the front cover 22 is in the closed position, the interlocking mechanisms 95 retain the pressing members 90 in their pressing position where the pressing members 90 can press the corresponding upper frames 511C downward. By configuring the pressing members 90 to be moved in interlocking relation to the opening and closing movement of the front cover 22 in this way, there is no need to move the pressing members 90 independently.

While the description has been made in detail with reference to the embodiments, it would be apparent to those skilled in the art that many modifications and variations may be made thereto.

What is claimed is:

1. An image forming apparatus comprising:
a housing having an opening;
a drawer movable through the opening between:
an inner position where the drawer is accommodated within the housing; and
an outer position where a portion of the drawer is exposed to an outside of the housing;
a drum cartridge attachable to and detachable from the drawer, the drum cartridge comprising
a photosensitive drum having a first end portion and a second end portion, and
a drum frame supporting the photosensitive drum, the drum frame comprising
a first side frame having an upper end portion, and a lower end portion supporting the first end portion of the photosensitive drum,
a second side frame having an upper end portion, and a lower end portion supporting the second end portion of the photosensitive drum, and
an upper frame connecting the upper end portion of the first side frame and the upper end portion of the second side frame to each other; and
a developing cartridge attachable to and detachable from the drum frame, the developing cartridge comprising
a developing roller having a first end portion and a second end portion;
a handle, a portion of the handle being positioned above the upper frame in a state where the drum cartridge to which the developing cartridge has been attached is attached to the drawer, and
a developing frame supporting the developing roller, the developing frame comprising
a first side frame supporting the first end portion of the developing roller,
a second side frame supporting the second end portion of the developing roller, and
a protrusion provided at the first side frame of the developing frame, the protrusion extending from the first side frame of the developing frame in a direction away from the second side frame of the developing frame, the protrusion being configured to engage with a portion of the drum cartridge in a state where the developing cartridge is attached to the drum frame.

2. The image forming apparatus according to claim 1, further comprising:
a cover movable between
a closed position where the cover closes the opening, and
an open position where the cover opens the opening;
a pressing member provided in the housing and configured to press the drum frame; and
an interlocking mechanism for moving the pressing member in interlocking relation to movement of the cover,
wherein the pressing member is movable between
a separated position where the pressing member is separated from the upper frame, and a pressing position where the pressing member can press the upper frame downward, wherein, when the cover is positioned at the open position, the interlocking mechanism retains the pressing member at the separated position, and wherein, when the cover is positioned at the closed position, the interlocking mechanism retains the pressing member at the pressing position.

3. The image forming apparatus according to claim 2, wherein the drum cartridge further comprises:

a drum cleaner for collecting residual toner remaining on a surface of the photosensitive drum; and a residual toner conveyance portion having an upper end portion and for conveying the residual toner collected by the drum cleaner, wherein the developing cartridge further comprises a residual toner container configured to accommodate therein the residual toner conveyed by the residual toner conveyance portion, and wherein, in the state where the drum cartridge to which the developing cartridge has been attached is attached to the drawer and the drawer is positioned at the inner position, the pressing member is positioned higher than the upper end portion of the residual toner conveyance portion.

4. The image forming apparatus according to claim 2, wherein the housing comprises a support plate, and wherein, in a state where the drum cartridge is attached to the drawer and the drawer is positioned at the inner position, the drum cartridge is disposed between the pressing member and the support plate.

5. The image forming apparatus according to claim 2, wherein the housing comprises a support plate, and wherein, in a state where the drum cartridge is attached to the drawer and the drawer is positioned at the inner position, the pressing member presses the drum cartridge toward the support plate.

6. The image forming apparatus according to claim 1, wherein the drum cartridge further comprises:

a leg movable between an expanding position where the leg expands from the drum frame, and a folded position where the leg does not expand from the drum frame; and an urging member urging the leg from the folded position toward the expanding position, wherein, in a state where the drum cartridge is detached from the drawer, the leg is positioned at the expanding position, and wherein, in a state where the drum cartridge is attached to the drawer, the leg is positioned at the folded position.

7. The image forming apparatus according to claim 1, wherein the housing comprises a support plate, and wherein, in a state where the drum cartridge is attached to the drawer and the drawer is positioned at the inner position, the support plate supports the drum frame from below.

8. The image forming apparatus according to claim 1, wherein the drum cartridge further comprises a pressure-fixing unit, and wherein, in a state where the developing cartridge is attached to the drum cartridge, the pressure-fixing unit presses the developing cartridge in a direction where the developing roller contacts the photosensitive drum to fix the developing cartridge in position.

9. An image forming apparatus comprising:

a housing having an opening;

a drawer movable through the opening between an inner position where the drawer is accommodated within the housing; and an outer position where a portion of the drawer is exposed to an outside of the housing;

a drum cartridge attachable to and detachable from the drawer, the drum cartridge comprising a photosensitive drum having a first end portion and a second end portion, and a drum frame supporting the photosensitive drum, the drum frame comprising a first side frame having an upper end portion, and a lower end portion supporting the first end portion of the photosensitive drum, a second side frame having an upper end portion, and a lower end portion supporting the second end portion of the photosensitive drum, and an upper frame connecting the upper end portion of the first side frame and the upper end portion of the second side frame to each other; and a developing cartridge attachable to and detachable from the drum frame, the developing cartridge comprising a developing roller, a handle, a portion of the handle being positioned above the upper frame in a state where the drum cartridge to which the developing cartridge has been attached is attached to the drawer, a toner container configured to accommodate toner therein, and a residual toner container configured to accommodate therein residual toner, the residual toner container comprising an inlet port through which the residual toner is collected into the residual toner container, and a shutter movable to open and close the inlet port.

* * * * *